United States Patent
Tang et al.

(10) Patent No.: US 10,272,767 B1
(45) Date of Patent: *Apr. 30, 2019

(54) DUAL LOOP LIQUID COOLING OF INTEGRATED ELECTRIC DRIVETRAIN

(71) Applicant: SF Motors, Inc., Santa Clara, CA (US)

(72) Inventors: Yifan Tang, Santa Clara, CA (US); Zhichun Ma, Santa Clara, CA (US)

(73) Assignees: SF Motors, Inc., Santa Clara, CA (US); Chongqing Jinkang New Energy Vehicle Co., LTD., Chongqing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/934,877

(22) Filed: Mar. 23, 2018

(51) Int. Cl.
| | | |
|---|---|---|
| *B60K 11/04* | (2006.01) | |
| *F01P 5/10* | (2006.01) | |
| *F01P 7/16* | (2006.01) | |
| *F01P 3/12* | (2006.01) | |
| *B60K 1/00* | (2006.01) | |

(Continued)

(52) U.S. Cl.
CPC ............... *B60K 11/04* (2013.01); *F01P 3/12* (2013.01); *F01P 5/10* (2013.01); *F01P 7/164* (2013.01); *B60K 2001/006* (2013.01); *F01P 2003/001* (2013.01); *F01P 2050/22* (2013.01); *F01P 2060/045* (2013.01); *F16H 57/0413* (2013.01); *F16H 2700/00* (2013.01)

(58) Field of Classification Search
None
See application file for complete search history.

(56) References Cited

U.S. PATENT DOCUMENTS 6,899,074 B1 * 5/2005 Carlsson ............. F16H 57/0412
123/196 AB
8,297,141 B2 * 10/2012 Cimatti .................... B60K 6/48
74/330

(Continued)

FOREIGN PATENT DOCUMENTS

| JP | 2007-247706 A | 9/2007 |
|---|---|---|
| JP | 2009-005499 A | 1/2009 |

OTHER PUBLICATIONS

International Search Report and Written Opinion for PCT/US2018/025874, dated Nov. 20, 2018.

(Continued)

*Primary Examiner* — Paul N Dickson
*Assistant Examiner* — Hilary L Johns
(74) *Attorney, Agent, or Firm* — Foley & Lardner LLP; James De Vellis

(57) ABSTRACT

Provided herein are systems and methods for cooling an electric drivetrain of an electric vehicle. The electric drivetrain can include an inverter, a gearbox and a motor. A first cooling system can use ethylene glycol and water (EGW) based coolant, and can include an EGW coolant loop to distribute the EGW based coolant to remove heat from a cold plate of the inverter, a housing of the gearbox, and a housing of the motor. A second cooling system can use an oil based coolant, and can include an oil coolant loop to distribute the oil based coolant to remove heat from internal components and the housing of the gearbox, and to remove heat from internal components and the housing of the motor. The second cooling system can include an oil coolant pump to control a flow of the oil based coolant through the oil coolant loop.

20 Claims, 11 Drawing Sheets

(51) Int. Cl.
*F01P 3/00* (2006.01)
*F16H 57/04* (2010.01)

(56) References Cited

U.S. PATENT DOCUMENTS

| | | |
|---|---|---|
| 2012/0091836 A1 | 4/2012 | Hayashi et al. |
| 2012/0153718 A1 | 6/2012 | Rawlinson et al. |
| 2013/0042825 A1 | 2/2013 | Shimasaki et al. |
| 2013/0119793 A1 | 5/2013 | Hofkirchner et al. |
| 2015/0381014 A1 | 12/2015 | Lee |
| 2016/0039277 A1 | 2/2016 | Falls et al. |
| 2016/0105084 A1 | 4/2016 | Ishimaru et al. |
| 2016/0318409 A1* | 11/2016 | Rawlinson .............. B60L 1/003 |
| 2017/0175612 A1* | 6/2017 | Tokozakura .............. F01P 3/18 |

OTHER PUBLICATIONS

U.S. Non-Final Office Action for U.S. Appl. No. 16/004,097, dated Oct. 5, 2018 (15 pgs).

\* cited by examiner

DUAL LOOP LIQUID COOLING OF INTEGRATED ELECTRIC DRIVETRAIN

BACKGROUND

Vehicles such as automobiles can include components that generate heat. Excessive heat build-up can cause performance degradation or damage to the components.

SUMMARY

The present disclosure is directed to systems and methods for cooling electric drivetrain components. In vehicles such as electric vehicles (EVs), designs for drivetrain systems can be compact, integrated and high power, which can present certain challenges for cooling the drivetrain systems. A drivetrain system can include a vehicle's motor, gearbox and inverter components.

At least one aspect is directed to a liquid cooled electric drivetrain system. The liquid cooled electric drivetrain system can include an electric drivetrain of an electric vehicle, comprising an inverter component, a gearbox component and a motor component. A first cooling system can use ethylene glycol and water (EGW) based coolant. The first cooling system can include an EGW coolant loop to distribute the EGW based coolant to remove heat from one or more cold plate(s) of the inverter internal components, a housing of the gearbox component, and a housing of the motor component. A second cooling system can use oil based coolant. The second cooling system can include an oil coolant loop to distribute the oil based coolant to remove heat from internal components and the housing of the gearbox component, and to remove heat from internal components and the housing of the motor component. An oil coolant pump can control a flow of the oil based coolant through the oil coolant loop. A heat exchanger to remove heat from the oil coolant loop to the EGW coolant loop, away from the electric drivetrain, to transfer to a vehicle cooling system having a radiator. The radiator can transfer heat to an exterior of the electric vehicle via ambient cooling.

At least one aspect is directed to a dual motor drivetrain system. The dual motor drivetrain system can include a first drive unit and a second drive unit of an electric vehicle. Each of the first drive unit and the second drive unit can include an electric drivetrain that includes an inverter component, a gearbox component, and a motor component. Each of the first drive unit and the second drive unit can include a first cooling system using ethylene glycol and water (EGW) based coolant. The first cooling system can include an EGW coolant loop to distribute the EGW based coolant to remove heat from internal components and the housing of the inverter component and a housing of the gearbox component, and a housing of the motor component. Each of the first drive unit and the second drive unit can include a second cooling system using oil based coolant. The second cooling system can include an oil coolant loop to distribute the oil based coolant to remove heat from internal components and the housing of the gearbox component, and to remove heat from internal components and the housing of the motor component. The EGW coolant loop of the first drive unit and the EGW coolant loop of the second drive unit can be connected within a coolant network for distributing the EGW based coolant.

At least one aspect is directed to a method for liquid cooling an electric drivetrain system of an electric vehicle that includes an inverter component, a gearbox component and a motor component. The method can include providing a first cooling system using ethylene glycol and water (EGW) based coolant. The first cooling system can include an EGW coolant loop to distribute the EGW based coolant to remove heat from internal components and the housing of the inverter component and a housing of the gearbox component, and a housing of the motor component. The method can include providing a second cooling system using oil based coolant. The second cooling system comprising an oil coolant loop to distribute the oil based coolant to remove heat from internal components and the housing of the gearbox component, and to remove heat from internal components and the housing of the motor component, and an oil coolant pump to control a flow of the oil based coolant through the oil coolant loop. The method can include providing a heat exchanger to remove heat from the oil coolant loop to the EGW coolant loop, away from the electric drivetrain, to transfer to a vehicle cooling system having a radiator. The radiator can transfer heat to an exterior of the electric vehicle via ambient cooling.

At least one aspect is directed to a method. The method includes providing an electric drivetrain system of an electric vehicle that includes, wherein the electric drivetrain includes an electric drivetrain of an electric vehicle, comprising an inverter component, a gearbox component and a motor component. The electric drivetrain can include a first cooling system that uses ethylene glycol and water (EGW) based coolant. The first cooling system can include an EGW coolant loop to distribute the EGW based coolant to remove heat from one or more cold plate(s) of the inverter internal components, a housing of the gearbox component, and a housing of the motor component. The electric drivetrain can include a second cooling system that uses oil based coolant. The second cooling system can include an oil coolant loop to distribute the oil based coolant to remove heat from internal components and the housing of the gearbox component, and from internal components and the housing of the motor component. The second cooling system can include an oil coolant pump to control a flow of the oil based coolant through the oil coolant loop. The electric drivetrain system can include a heat exchanger to remove heat from the oil coolant loop to the EGW coolant loop, away from the electric drivetrain, to transfer to a vehicle cooling system having a radiator. The radiator can transfer heat to an exterior of the electric vehicle via ambient cooling.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
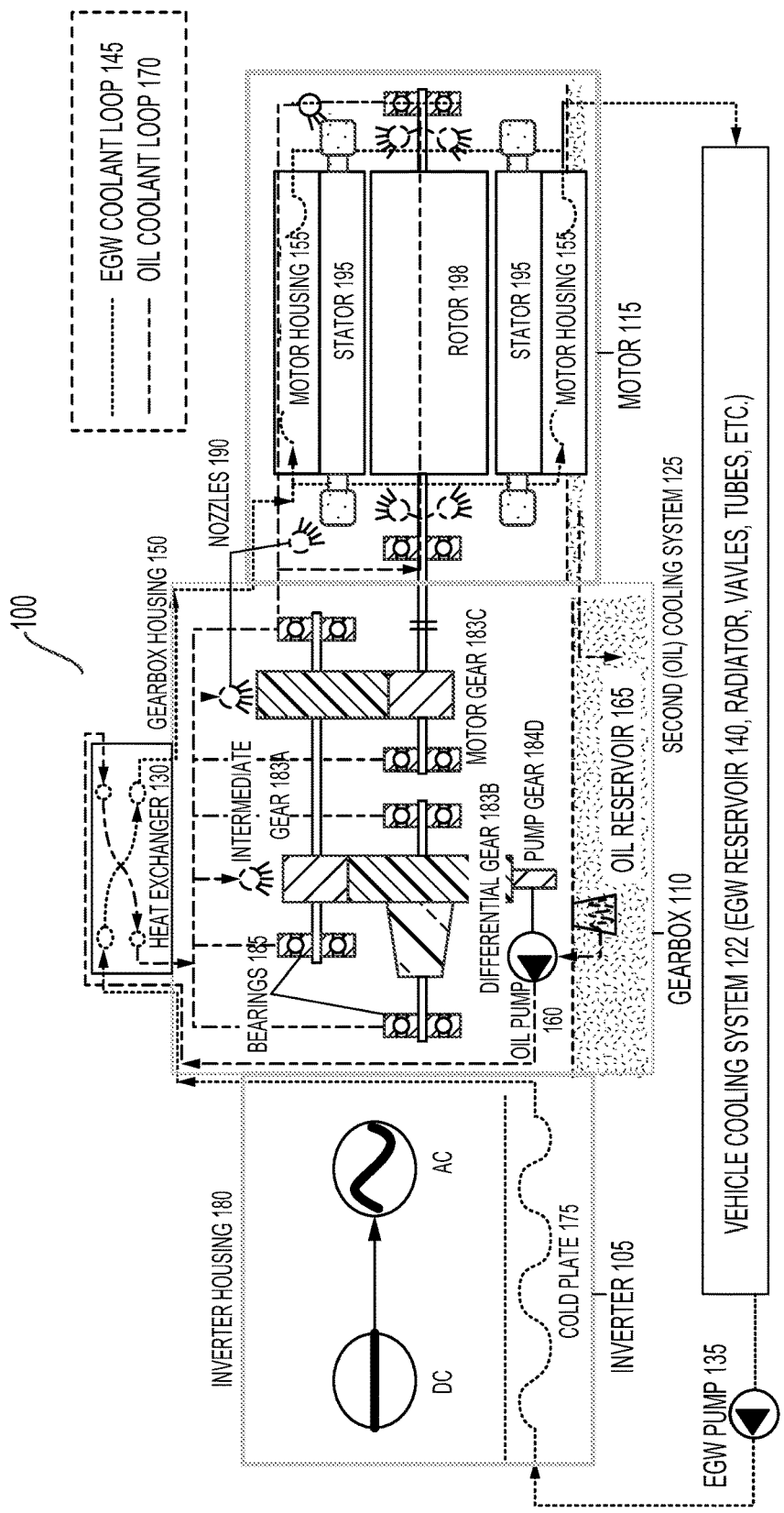
FIG. 1 is a block diagram depicting an example electric drivetrain system of a vehicle.

Following below are more detailed descriptions of various concepts related to, and implementations of, methods, apparatuses, and systems for cooling electric drivetrain components. The various concepts introduced above and discussed in greater detail below may be implemented in any of numerous ways.

In vehicles such as EVs, designs for corresponding drivetrain systems can be compact, integrated and high power. Some aspects of the designs can present certain challenges for cooling the drivetrain system. A drivetrain system can include a vehicle's motor, gearbox and inverter components for example. EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned. EVs can contain a multitude of electronic control units (ECUs) networked together for communicating and interfacing with one another. One or more ECUs can control the cooling and operation of the drivetrain system as a whole or particular components (e.g., gearbox, oil based cooling system) of the drivetrain system. An ECU can be an embedded system that controls one or more of the electrical system or subsystems in a transport vehicle. An ECU is sometimes referred to as an automotive computer, and can include a processor or microcontroller, memory, embedded software, inputs/outputs and communication link(s). An ECU involves hardware and software to perform the functions expected from that particular module. For example, types of ECU include Electronic/engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, or control module. Other examples include domain control unit (DCU), Electric Power Steering Control Unit (PSCU), Human-machine interface (HMI), Telematic control unit (TCU), Speed control unit (SCU), Battery management system (BMS), and so on.

The cooling system of a drivetrain system can be based on a coolant such as oil. In some cases, a water based coolant can be used in place of oil. Each type of coolant has particular characteristics (e.g., flow rate, thermal capacity, and corrosiveness) that can make the particular coolant suitable or unsuitable for certain applications or context. For instance, a cooling system based on water based coolants can have smaller coolant distribution tubes due to higher flow rates and lower viscosity of water based coolants. As another example, water based coolants can be less suitable than oil based ones for internal gearbox use, as water can result in corrosion, rusting or damage of gearbox components (e.g., in case of coolant leaks). Oil based coolants can avoid or prevent corrosion, rusting or damage of components within a gearbox or motor for instance. Use of oil based coolants in some contexts can be advantageous as they can operate as lubricant for certain components such as gears and bearing (e.g., ball bearings) in a gearbox or motor for instance. An oil based coolant can be sprayed or splashed onto components (e.g., as gears and bearing), to transfer heat away from such components, as well as to provide lubrication to facilitate mechanical operation. Due to the corrosiveness of water based coolants for instance, such coolants may be limited to be circulated or distributed across certain (e.g., less susceptible or sensitive) portions of the drivetrain system (e.g., in or outside the housing of a gearbox or motor), instead of being in contact with or proximate to certain internal components (e.g., gears, bearings, drive shafts).

As such, a drivetrain system that is based on either an oil based coolant or a water based coolant would face challenges due to the limitations of each type of coolant, and can entail rather complicated design in order to provide a certain level or effectiveness of cooling to meet operating requirements for various components of the drivetrain system. For example, a drivetrain system that is only reliant on a water based coolant can have limited internal cooling (if any) via coolant circulation, which can expose the drivetrain system to the risk of certain overheating internal components, or large differentials in temperature between internal and external components. Such a drivetrain system can circulate water based coolant internally with the risk of leakage and corrosion. Further, a drivetrain system relying only on an oil based coolant may not be able to achieve a high flow rate, or flexible or rapid flow rate control, to enable effective control of certain components' temperature. Circulating oil based coolant in or outside a housing of a drivetrain system can create risk of leakage that is susceptible to fire, explosion, contamination or pollution.

Moreover, in EVs where high power electric traction motors are rated at a power of 150 kilowatts (KWs) or more (e.g., 200 kW, 300 KW, 400 KW, 500 KW and so on), a drivetrain system relying either on an oil based coolant or a water based coolant may not be feasible, reliable or achievable as the level of cooling possible may not be sufficient. Hence, the methods, apparatuses, and systems for cooling electric drivetrain components described herein can include or support dual or multiple coolant use, sometimes referred to herein as dual loop cooling, or multiple loop cooling (e.g., when two or more coolants are used). Such dual or multiple loop cooling can incorporate advantages or benefits of each of multiple types of coolant, and can avoid or mitigate potential issues or risks from each type of coolant. For example, a drivetrain system can include a first cooling system using ethylene glycol and water (EGW) based coolant, having an EGW coolant loop to distribute the EGW based coolant to remove heat from a cold plate of the inverter component, a housing of the gearbox component, and a housing of the motor component. The same drivetrain system can also have a second cooling system using oil based coolant, that includes an oil coolant loop to distribute the oil based coolant to remove heat from internal components and the housing of the gearbox component, and heat from internal components and the housing of the motor component. The drivetrain system can for instance include an EGW coolant pump with a pump controller in communication with the second cooling system, to adjust the flow of the EGW based coolant through the EGW coolant loop when the second cooling system is operating at a reduced coolant flow rate or a heat removal rate, that is below a defined threshold for example.

Referring to FIG. 1, among others, depicted is an example electric drivetrain system 100 of a vehicle. The electric drivetrain system 100 can be a fluid-cooled (e.g., liquid-cooled) electric drivetrain system 100. The electric drivetrain system 100 can use various types and forms of coolants in any state, for example in liquid, liquefied, or gaseous states. For example, a particular coolant can change state or form (e.g., from gaseous to liquefied state when cooled or pressurized, and from liquefied to gaseous state when heated or depressurized) as the coolant moves through a cooling system of the electric drivetrain system 100. The electric drivetrain system 100 (sometimes referred to as drivetrain or drive unit) can include an inverter component 105, a gearbox component 110, a motor component 115, a first cooling system 120, a second cooling system 125, a heat exchanger 130, among other components. The first cooling system 120 and the second cooling system 125 can provide dual loop cooling for the drivetrain 100. The first cooling system 120 (sometimes referred to as EGW cooling system) can include or be operably coupled to an EGW pump 135 and an EGW reservoir 140, and can include an EGW coolant loop 145 to distribute the EGW based coolant to remove heat from various components of the drivetrain 100 (e.g., a cold plate 175 of the inverter component 105, a housing 150 of the gearbox component 110, and a housing 155 of the motor component 115) into a vehicle cooling system 122 (e.g., including a radiator, valves, tubes, at least a portion of the EGW reservoir 140). The vehicle cooling system 122 can include one or more components for facilitating transfer of heat from the drivetrain 100, the EGW reservoir, the EGW coolant loop 145 and/or other portions of the vehicle, to an exterior of the vehicle. The second cooling system 125 (sometimes referred to as oil cooling system) can include or be operably coupled to an oil pump 160 and an oil reservoir 165, and can include an oil coolant loop 170 to distribute oil based coolant to remove heat from various components of the drivetrain 100 (e.g., internal components and the housing 150 of the gearbox component 110, and internal components and the housing 155 of the motor component 115). The oil coolant loop 170 and the EGW coolant loop 145 are sometimes referred to herein as dual cooling loops. The inverter component 100 (sometimes referred to herein as an inverter assembly or inverter) can include one or more cold plate(s) 175 and an inverter housing 180. The gearbox component 110 (sometimes referred to as gearbox assembly or gearbox) can include the gearbox housing 150, one or more gears 183, one or more bearing assemblies 185 (sometimes referred to as bearings), and one or more nozzles 190 for delivering oil based coolant. The motor component 115 (sometimes referred to as motor assembly, motor or traction motor) can include the motor housing 155, a stator 195, a rotor 198, one or more bearings 185, and one or more nozzles 190 for delivering oil based coolant.

Each of the components of the drivetrain 100 can be implemented using hardware (e.g., circuitry, material or structures) or a combination of software and hardware. For instance, some of these elements or entities can include any application, program, library, script, task, service, process or any type and form of executable instructions executing on hardware of the drivetrain 100, such as ECU(s), or electronic components of the drivetrain 100 communicating with ECU(s) of the corresponding host vehicle. The hardware can include circuitry such as one or more processors, and can include one or more transistors. One or more ECUs can control or manage the drivetrain 100.

The drivetrain 100 can be designed or rated to operate within a certain temperature range, or below a certain temperature limit or threshold, so as to operate within a certain range of efficiency, power rating and performance level (e.g., 150 KW-250 KW) for example. By way of non-limiting examples, the drivetrain's external (ambient or environmental) temperature range of operation can be designed or specified to be −40 to 40 degree Celsius (C), and the motor's internal temperature can be designed or specified to range from −40 C to 180 C at various spots, gear-box internal temperature can be designed or specified to range from −40 C to 100 C at various spots, and inverter internal temperature can be designed or specified to range from −40 C to 150 C at various spots. Various components of the drivetrain 100 can be designed with operating temperature range(s) that are different from the above, depending on the type and performance of the host vehicle for instance. Different parts of the drivetrain 100 can generate different amounts of heat as heat loss, and can be subject to different temperature operational limits. To maintain different parts of the drivetrain 100 within their respective temperature operational limits or ranges, implementations disclosed herein can provide a system structure or configuration to improve or optimize a drivetrain's cooling effectiveness, using at least two types of coolants, and complementary, coordinated cooling systems, as compared to a typical drivetrain system using one cooling system based on a single type of coolant for instance.

The motor 115 of the drivetrain 100 can include the motor housing 155, a stator 195, a rotor 198, one or more bearings 185, and one or more nozzles 190 for delivering oil based coolant. The housing 155 can include a motor housing integrated with internal fluid channels, and can include a water jacket or fluid jacket comprising one or more channels or grooves for channeling EGW. The motor 115 can include any type of motor for propulsion of a vehicle, such a direct current (DC) motor, alternating current (AC) operated series motor, an AC induction motor, or a synchronous motor. The motor 115 can include a stator 195 and a rotor 198. The stator 195 can include a stator core, conducting wires and a frame or housing 155. The stator core can correspond to a stack of electrical steel lamination rings that are insulated from one another and laminated together. These rings can have slots on the inside of the rings that the conducting wires can wrap around to form the stator coils. The stator core is placed within the frame or housing 155. The rotor 198 can include a rotor core, conducting rods, end caps, a shaft, and bearing(s). The rotor core can be cylindrical and runs through the center of the rotor 198. While the stator 195 remains fixed, the rotor 198 can spin around its shaft and create torque. The stator 195 and the rotor 198 can interact magnetically so as to convert electrical energy to mechanical energy and vice versa.

The motor 115 can be rated at any power, such as 50 KW or 200 KW for instance. The motor 115 can be a high power electric traction motor, which can be rated to produce a power of at least 150 KW in general, e.g. 200 KW, 300 KW, 400 KW, 500 KW. The motor 115 can operate at any speed up to a limit of 18000 revolutions per minute (rpm) for instance, and can operate at a speed of 5000 or 10000 rpm for example. The motor 115 can be a high speed motor with a speed range of 12000 to 18000 rpm, or higher, for example. The efficiency of the motor 115 can be any value, such as 85% or higher, and be within a certain range. For instance, the efficiency of the motor 115 can be within 90~98% (e.g., ratio between output shaft power and input electrical power, expressed as a percentage). The efficiency of the motor 115 can vary due to type of the motor 115, and can depend on operation points (e.g., idling state, torque, speed, acceleration of the vehicle). Heat losses from the motor 115 can be mainly generated in the stator windings, stator steel laminations, and rotor steel laminations. The heat loss from the motor 115 can depend on the efficiency of the motor 115, and can vary due to the type and design of the motor 115, and can depend on operation points (e.g., idling state, speed, acceleration of the vehicle). For example, motor heat loss can range from a few KW to tens of KWs, for example, 5 KW to 20 KW or another range, depending on the motor design and vehicle's operational condition (e.g., idling, constant speed, acceleration), power output, torque levels, etc.

The inverter 105 can be integrated with the gearbox 110 and the motor 115, e.g., into an integrated electric drivetrain 100. The inverter 105 can include or correspond to an electrical device that converts electricity derived from a direct current (DC) source to alternating current (AC) of the type that can be used to drive a device or appliance (e.g., in a hybrid car or EV). DC power, from a battery for example, can be fed to internal power electronic components within the inverter housing 180. Through electronic switches (e.g., a set of semiconductor transistors), the direction of the flow of current is continuously and regularly flip-flopped. The in/out flow of electricity can produce AC current within inverter power electronic circuit. This induced alternating current electricity can provides power for an AC input, for example, in an EV's electric traction motor.

The inverter 105 of the drivetrain 100 can include one or more cold plates 175 and an inverter housing 180. The cold plate 175 can be part of or separate from (e.g., proximate to and inside of) the inverter housing 180, to transfer heat away from components of the inverter 105 such as the inverter housing 180 or switch(es) within the inverter 105. Heat losses from the inverter 105 can typically amount to about half the amount that the motor 115 loses, and can be more or less than half the amount that the motor 115 loses. For example, heat losses from the inverter 105 can be from a few KW to tens of KWs, for example, 2.5 KW to 10 KW or another range, depending on the inverter design and vehicle's operational condition (e.g., idling, constant speed, acceleration), power output, torque levels, etc.

Heat losses from the inverter 105 can be mainly from power semiconductors within the inverter 105, which can be mounted on cold plate heatsinks with thermal interface material between cold plate(s) 175 and the power semiconductors. The cold plate(s) 175 can typically be mounted to the inverter's housing 180, or to enclosures that provide mechanical support structures. The housing 180 or enclosure can be the cold plates 175 themselves. The cold plate(s) can have liquid cooling channels going through them.

The gearbox 110 of the drivetrain 100 can be part of, or referred to herein as the transmission of the host vehicle or a transmission box. The gearbox 110 can include the gearbox housing 150, one or more gears 183, one or more bearings 185, and one or more nozzles 190, and cooling channels for delivering oil based coolant. Heat loss from the gearbox 110 can typically be about half of the heat loss from the inverter 105, or about a fifth of the motor's heat loss. For example, heat losses from the gearbox 110 can be from about a fraction to a KW to a few KWs, for example, 0.8 KW to 5 KW or another range, depending on the gearbox design and vehicle's operational condition (e.g., idling, constant speed, acceleration), power output, or torque levels.

The gearbox 110 can comprise a mechanical device used for torque increase or decrease via speed reduction or increase. The gearbox 110 can include two or more gears 183 with one of the gears driven by the motor 115 for instance. The output speed of the gear box 110 can be inversely proportional to a gear ratio between two gears 183. For instance, the gearbox 110 can include a driving gear with a certain diameter coupled to the driving mechanism (motor 115) linked to another gear of smaller (if the driven mechanism will have a higher speed than the driving one) or larger diameter (if the speed of the driven mechanism should be smaller than that of the driving one) coupled to a driven mechanical load (e.g., vehicle wheels or wheel shafts). The gearbox 110 can attach to the motor 115 and can transform the motor's high speed, low torque (compared to the output torque of gearbox) to low speed, high torque, or from low speed, high torque to high speed, low torque.

The first cooling system (or EGW cooling system) 120 can use an ethylene glycol and water (EGW) based coolant, which can include a mixture of ethylene glycol and water, and possibly other component(s) such as other chemical(s) or organic compound(s). The EGW reservoir 140 can store, hold or circulate an amount of EGW based coolant for use in the EGW cooling system 120. Although an EGW based coolant is discussed here and elsewhere in this disclosure, this is merely for illustration and not limiting in any way. For example, other water based coolants (e.g., mixture of water with one or more additives, organic compounds or chemicals) can alternatively be used.

The EGW cooling system 120 can include the EGW pump 135 and the EGW reservoir 140. The EGW cooling system 120 can be operably coupled (e.g., via coolant tubes) to an EGW pump 135 and an EGW reservoir 140, both of which can be external to the drivetrain 100 for example. The EGW cooling system 120 can include an EGW coolant loop 145 to distribute or circulate EGW based coolant (sometimes referred herein simply as EGW), to remove or transfer heat from various components of the drivetrain 100 (e.g., a cold plate 175 of the inverter component 105, a housing 150 of the gearbox component 110, and a housing 155 of the motor component 115). The EGW coolant loop 145 can transfer the heat from the various components of the drivetrain 100, transferred via the heat exchanger 130 for example, to be removed, dissipated or otherwise transferred away from the drivetrain 100. The EGW pump 135 can provide or pump EGW from the EGW reservoir 140, into one end (or an inlet of) the EGW coolant loop 145 for circulation across portions of the drivetrain 100. The EGW coolant loop 145 can circulate or return the EGW pumped into the EGW coolant loop 145, to the EGW reservoir 140 at another end (or an outlet) of the EGW coolant loop 145, and then transfer the heat from the drivetrain system to a vehicle cooling system 122 (e.g. having a radiator to transfer heat to an exterior of the vehicle, via ambient cooling for instance).

The EGW coolant loop 145 can be disposed in a path passing through or passing proximate to one or more of the following portions of the drivetrain 100 using one or more coolant tubing, pipes, valves, grooves and channels: EGW reservoir 140, EGW pump 135, housing 180, cold plate 175 (internal to inverter 175 or in housing 180), housing 180, housing (or cold plate) 150, heat exchanger 130, housing (or cold plate) 150, housing (or cold plate) 155, rotor 198, EGW reservoir 140. An example path for the EGW coolant loop 145 is depicted in dotted line form in FIG. 1. The path can pass through or proximate to these portions in the sequence indicated above, along a direction of flow of the EGW, or in a different sequence. For example, depending on how the inverter 105, the gearbox 110 and the motor 115 are arranged relative to one another, the path through the components can be different. For instance, where the motor 115 and the inverter 105 are integrated to be on a same side relative to the gearbox 110 (e.g., inverter 105 stacked on motor 115), a section of the path can pass or connect directly between a component of the inverter 105 and a component of the motor 115.

The path can also pass through or pass proximate to one or more housing interfaces, e.g., between the inverter 105 and the gearbox 110, and between the gearbox 110 and the motor 115. Such housing interfaces can function as cold plates. The path can exclude one or more of any of the portions listed or identified above, and can include other portion(s) of the drivetrain 100 and possibly other portion(s) of the host vehicle. For example, in some implementations, it can be optional for the path to pass through or pass proximate to one or more of the housing interfaces and the rotor 198.

A typical flow rate for EGW can be in the range of about 6 to 20 liters per minute (lpm) for example, but can be of any value, or extend beyond this range, depending on the corresponding application and operational requirements. For example, in a high power motor drivetrain system, the flow rate for EGW can be in the range of about 12 to 20 lpm, or higher (e.g., a flow rate of 30 lpm).

The EGW cooling system 120 can have smaller coolant distribution tubes (e.g., as compared with those of the oil cooling system 125) due to higher flow rates and lower viscosity of EGW based coolant (e.g., as compared with an oil based coolant) for instance. The EGW cooling system 120 can use distribution tubes or channels that are of a larger or same diameter as compared to that of the oil cooling system 125 in some implementations, for instance to increase the flow rate range of the EGW based coolant. The EGW cooling system 120 can be configured to direct or limit the flow of the EGW based coolant to be within certain (e.g., less susceptible or sensitive) portions of the drivetrain system (e.g., in or outside the housing of a gearbox or motor), instead of being in contact with or proximate to certain internal components (e.g., gears, bearings, drive shafts) that can be more susceptible or sensitive to corrosion or chemical reaction.

The EGW pump 135 (sometimes referred to as EGW coolant pump) is configured to control a flow of the EGW based coolant through the EGW coolant loop 145. The EGW pump 135 can have or include a pump controller. The EGW pump 135 can be managed or controlled by an ECU of the host vehicle, via the pump controller, to set or adjust a flow rate and a direction of the EGW in the EGW coolant loop 145, or in a portion (e.g., a branched portion) of the EGW coolant loop 145 for instance. For example, a plurality of heat, temperature or infra-red sensors can be disposed at locations on or near various components of the drivetrain 100, to collect information about the temperature or heat dissipation at each respective location. A sensor monitoring the cold plate 175 for instance, can transmit the collected information to the ECU, which can compare the collected information to a defined threshold or operating range for the inverter 105 at the location of the cold plate 175. If the ECU determines, based on the collected information, that the temperature or heat generated at the location of the cold plate 175 is beyond the defined threshold or operating range, the ECU can send a signal or instruction to the pump controller to increase a flow rate of the EGW (to 20 lpm for instance) to the cold plate 175. When the temperature or heat generated at the location of the cold plate 175 is determined by the ECU (based on further information collected by the sensor) to be within the defined threshold or operating range, the ECU can send a signal or instruction to the pump controller of the EGW pump 135, to adjust a flow rate of the EGW (to 10 lpm for instance) to the cold plate 175.

The pump controller can be in communication with the second cooling system 125 (sometimes referred to as oil cooling system), for example to adjust a flow rate of the EGW based coolant through the EGW coolant loop 145 when the second cooling system 125 is operating at a coolant flow rate or a heat removal rate below a defined threshold (e.g., of 5 lpm or 2.5 KW, respectively). For example, an operations monitor of the oil cooling system 125 can send a message to the pump controller, indicating a coolant flow rate, a heat removal rate or an operating state (e.g., inactive, low flow operation, or high flow operation) of the oil cooling system. For instance, the operations monitor can determine that the oil cooling system 125 is in a state of low flow operation (e.g., below 2 lpm) based on a rotational speed of a differential gear of the gearbox 110 coupled to or controlling the oil pump 160, and can determine that the EGW cooling system 120 should increase its rate of heat removal from drivetrain components to compensate for the low rate of heat removal by the oil cooling system 125. The pump controller can process the message to determine whether to adjust a flow rate or a direction of the EGW for instance.

The operations monitor of the oil cooling system 125 can send a request or instruction to the pump controller to adjust a flow rate (e.g., to a certain flow rate, such as 20 lpm) or a direction (e.g., forward or reverse direction) of the EGW for instance. In some examples, the operations monitor of the oil cooling system 125 does not communicate directly with the pump controller, but rather via the ECU that manages or controls the EGW pump 135. For example, instead of the pump controller receiving the message, request or instruction from the operations monitor as discussed above, the ECU receives the message, request or instruction from the operations monitor, determines an adjustment (e.g., flow rate, direction) for the pump controller to make, and instructs the pump controller to make the adjustment.

The second cooling system 125 (sometimes referred to as oil cooling system) can include an oil pump 160 and an oil reservoir 165. The oil pump 160 can be placed inside or outside the gearbox or drivetrain components. The oil pump 160 can be driven by coupled gear inside the gearbox 110 and mechanically or electrically driven. The oil cooling system 125 can be operably coupled (e.g., via coolant tubes) to an oil pump 160 and an oil reservoir 165, both of which can be internal to the drivetrain 100 for example. The oil cooling system 125 can include an oil coolant loop 170 to distribute oil based coolant to remove heat from various components of the drivetrain 100 (e.g., internal components and the housing 150 of the gearbox component 110, and internal components and the housing 155 of the motor component 115). The oil based coolant (sometimes referred to simply as oil, or oil coolant) can comprised any type of oil or transmission fluid. The oil can be an automatic transmission fluid (ATF), such as a low viscosity or an ultra low viscosity (ULV) type of ATF. Examples of an ATF that can be used would include Dexron IV or VI. The oil can be used as coolant in the oil coolant loop 170 for cooling, and can be used for lubrication and cooling of gears and bearings (e.g., in the gearbox 110, and possibly bearings in the motor 115). Although described as an oil based coolant here and elsewhere in this disclosure, this is merely for illustration and not limiting in any way. For example, the coolant used for the second cooling system 125 can be any fluid suitable for use as a transmission fluid, coolant fluid or lubrication fluid, and not necessarily oil-based.

The oil cooling system 125 can be operably coupled to an oil pump 160 and an oil reservoir 165. The oil cooling system 125 can include the oil pump 160 and the oil reservoir 165. The oil cooling system 125 can include an oil coolant loop 170 to distribute or circulate oil based coolant to remove or transfer heat from various components of the drivetrain 100 (e.g., housing 180 of the inverter component 105, a housing 150 of the gearbox component 110, internal components of the gearbox 110 such bearings 185 and gears 183, a housing 155 of the motor component 115, end plates of the motor component 115, and portions of the rotor 198 and stator 195). The oil coolant loop 170 can transfer the heat from the various components of the drivetrain 100 to the heat exchanger 130, to be removed, dissipated or otherwise transferred away from the drivetrain 100. The oil pump 160 can provide or pump oil from the oil reservoir 165, into one end (or an inlet of) the oil coolant loop 170 for circulation across portions of the drivetrain 100. The oil coolant loop 170 can circulate or return the oil pumped into the oil coolant loop 170, to the oil reservoir 165 at another end (or an outlet) of the oil coolant loop 165.

The oil coolant loop 165 can be disposed in a path (e.g., oil path) passing through or passing proximate to one or more of the following portions of the drivetrain 100 using one or more coolant tubing, pipes, grooves and channels: oil reservoir 165, oil pump 160, housing 180, housing (or cold plate) 150, heat exchanger 130, gears 183 and bearings 185, housing (or cold plate) 150, housing (or cold plate) 155, end plates of the motor component 115, portions of the rotor 198 and stator 195, EGW reservoir 140. An example oil path for the oil coolant loop 165 is depicted in dashed line form in FIG. 1. The oil path can pass through or proximate to these portions in the sequence indicated above, along a direction of flow of the oil, or in a different sequence. For example, depending on how the inverter 105, the gearbox 110 and the motor 115 are arranged relative to one another, the path through the components can be different. For instance, where the motor 115 and the inverter 105 are integrated to be on a same side relative to the gearbox 110 (e.g., inverter 105 stacked on motor 115), a section of the oil path can pass or connect directly between a component of the inverter 105 and a component of the motor 115.

The oil path can also pass through or pass proximate to one or more housing interfaces, e.g., between the inverter 105 and the gearbox 110, and between the gearbox 110 and the motor 115. In some implementations, the oil path can exclude one or more of any of the portions listed or identified above, and can include other portion(s) of the drivetrain 100 and possibly other portion(s) of the host vehicle. For example, in some implementations, it can be optional for the oil path to pass through or pass proximate to one or more of the housing interfaces and the end plates of the motor 115.

A typical flow rate for oil can be in the range of about 6 to 20 liters per minute (lpm) for example, but can be of any value, or extend beyond this range, depending on the corresponding application and operational requirements. For example, in a high power motor drivetrain system, the flow rate for oil can be in the range of about 12 to 20 lpm, or higher (e.g., a flow rate of 25 lpm).

The oil cooling system 125 can have larger (e.g., in diameter) coolant distribution tubes or channels (e.g., as compared with those of the EGW cooling system 120) due to potentially lower flow rates and higher viscosity of oil based coolant (e.g., as compared with an EGW based coolant) for instance. The oil cooling system 125 can use distribution tubes that are of a smaller or same diameter as compared to that of the EGW cooling system 120 in some implementations, for instance to decrease the flow rate range of the oil based coolant. The oil cooling system 125 can be configured to direct the flow of the oil based coolant to certain portions of the drivetrain system to provide lubrication in addition to cooling for instance. Oil can be used to provide direct cooling of gears 183, bearings 185, motor stator end-windings (e.g., inner surfaces), and rotor stack ends, by direct oil splashing for example.

For instance, a portion of the oil coolant loop 170 can extend or branch out (e.g., from or near the heat exchanger 130) to deliver oil to the gears 183 (such as motor gear 183C coupled to the rotor 198) and bearings 185, via nozzles 190 for instance, to splash or spray oil onto surfaces of the gears 183 and bearings 185 within the gearbox 110. Any portion of the splashed or sprayed oil that drips, drains or otherwise comes off the gears 183 and bearings 185, can be collected in a portion of the oil reservoir 165 located beneath the gears 183 and bearings 185 for instance, at a bottom portion of the gearbox 110.

As another example, a portion of the oil can pass from rotor shaft opening(s) which can act as nozzle(s) splashing or spraying to stator windings inner portions. A portion of the oil can pass from rotor shaft opening(s) to end plates or end surfaces of the rotor (assembly) 198. A portion of the oil coolant loop 170 can extend from the housing 155 near one or both ends of the stator 195, and can extend to nozzles 190 for instance, to optionally splash or spray on the end plates or end surfaces, or bearings 185 of the rotor 198 for example. One or more of these cooling methods can be used. Any portion of the splashed or sprayed oil that drips, drains or otherwise comes off the end plates or end surfaces, or bearings 185, can be collected in a portion of the oil reservoir 165 located beneath the end plates or end surfaces, or bearings 185 for instance, at a bottom portion of the motor 115.

The oil pump 160 (sometimes referred to as oil coolant pump) can control a flow of the oil based coolant through the oil coolant loop 170. The oil pump 160 can be a mechanical pump (e.g., internal to the drivetrain 100 or gearbox 110), that can be driven or controlled by a pump gear 184D coupled to a differential gear 183B of the gearbox 110. Due to the low rotational speed of the differential gear 183 at low motor or vehicle speed, the oil pump 160 can have a low pump speed (and low oil flow rate, e.g., 0.5 lpm) at a low motor or vehicle speed (e.g., 5 miles per hour). At a comparatively higher motor or vehicle speed (e.g., 60 miles per hour), because of the correspondingly high rotational speed of the differential gear 183B, the oil pump 160 can have a high pump speed (and high oil flow rate, e.g., 18 lpm). As such, at the low motor or vehicle speed, the EGW cooling system 120 can increase its coolant flow for sufficient cooling to certain portions of the drivetrain 100 (e.g., the motor 115) to compensate for the low pump speed of the oil pump 160. Similarly, at a comparatively higher motor or vehicle speed (e.g., 60 miles per hour), the EGW cooling system 120 can adjust its coolant flow (e.g., to a normal flow rate, such as 15 lpm) under some conditions to account for the higher pump speed of the oil pump 160.

The oil pump 160 can have or include an oil pump controller. The oil pump 160 can be managed or controlled by an ECU of the host vehicle, via the oil pump controller, to set or adjust a flow rate and a direction of the oil in the oil coolant loop 170, or in a portion (e.g., a branched portion) of the oil coolant loop 170 for instance. For example, a plurality of heat, temperature or infra-red sensors can be disposed at locations on or near various components of the drivetrain 100, to collect information about the temperature or heat dissipation at each respective location. A sensor monitoring the stator 195 for instance, can transmit the collected information to the ECU, which can compare the collected information to a defined threshold or operating range for the motor 115 at the location of the stator 195. If the ECU determines, based on the collected information, that the temperature or heat generated at the location of the stator 195 is near or beyond the defined threshold or operating range, the ECU can send a signal or instruction to the oil pump controller to increase a flow rate of the oil (to 18 lpm for instance) to the stator 195. When the temperature or heat generated at the location of the stator 195 is determined by the ECU (based on further information collected by the sensor) to be within the defined threshold or operating range, the ECU can send a signal or instruction to the oil pump controller of the oil pump 160, to adjust a flow rate of the oil (to 12 lpm for instance) to the stator 195.

The oil pump controller can be in communication with the EGW cooling system 120, for example to adjust a flow rate of the oil based coolant through the oil coolant loop 170 when the EGW cooling system 120 is operating at a coolant flow rate or a heat removal rate below a defined threshold (e.g., of 6 lpm or 5 KW, respectively). For example, an operations monitor of the EGW cooling system 120 can send a message to the oil pump controller, indicating a coolant flow rate, a heat removal rate or an operating state (e.g., inactive, low flow operation, or high flow operation) of the EGW cooling system 120. For instance, the operations monitor can determine that the EGW cooling system 120 is in a state of low flow operation (e.g., below 3 lpm) based on a pump rate of the EGW pump 135, and can determine that the oil cooling system 125 should increase its rate of heat removal from drivetrain components to compensate for the low rate of heat removal by the EGW cooling system 120. The oil pump controller can process the message to determine whether to adjust a flow rate or a direction of the oil for instance.

The operations monitor of the EGW cooling system 120 can also send a request or instruction to the oil pump controller to adjust a flow rate (e.g., to a certain flow rate, such as 20 lpm) or a direction (e.g., forward or reverse direction) of the oil for instance. In some examples, the operations monitor of the EGW cooling system 120 does not communicate directly with the oil pump controller, but rather via the ECU that manages or controls the oil pump 160. For example, instead of the oil pump controller receiving the message, request or instruction from the operations monitor as discussed immediately above, the ECU can receive the message, request or instruction from the operations monitor, determine an adjustment (e.g., flow rate, direction) for the oil pump controller to make, and instructs the oil pump controller to make the adjustment.

The drivetrain 100 can include a heat exchanger 130. The heat exchanger 130 can be in a path of each of the oil coolant loop 170 and the EGW coolant loop 145. The heat exchanger 130 can transfer heat carried in the oil coolant loop 170 to the EGW coolant loop 145, and then to the vehicle cooling system 122, through the radiator to an exterior of the vehicle (ambient air), away from the drivetrain 100. The heat exchanger 130 can incorporate a fluid transfer and cooling mechanism to extract heat carried in the oil coolant loop 170 to the EGW coolant loop 145. The heat exchanger 130 can be coupled with a radiator system of the host vehicle. The heat exchanger 130 can incorporate one or more heatsinks, fins or air-cooling or radiative structures, to facilitate transfer of the heat away from the drivetrain 100. The heat exchanger 130 can incorporate one or more fans or other forced air devices, to facilitate transfer of the heat away from the drivetrain 100. The heat exchanger 130 can be located on an upper or lower portion (or lower portion, for example) of the drivetrain 100, above for instance the gearbox 110 (or motor 115 or inverter 105).

By combining and coordinating the operation of the EGW cooling system 120 and the oil cooling system 125, in manners described herein, the EGW cooling system 120 can be designed or configured to dissipate about 70% of total heat from the motor 115 and gearbox 110, and the oil cooling system 125 can be designed or configured to dissipate about 30% of total heat from the motor 115 and gearbox 110 for instance.

Figure 2:
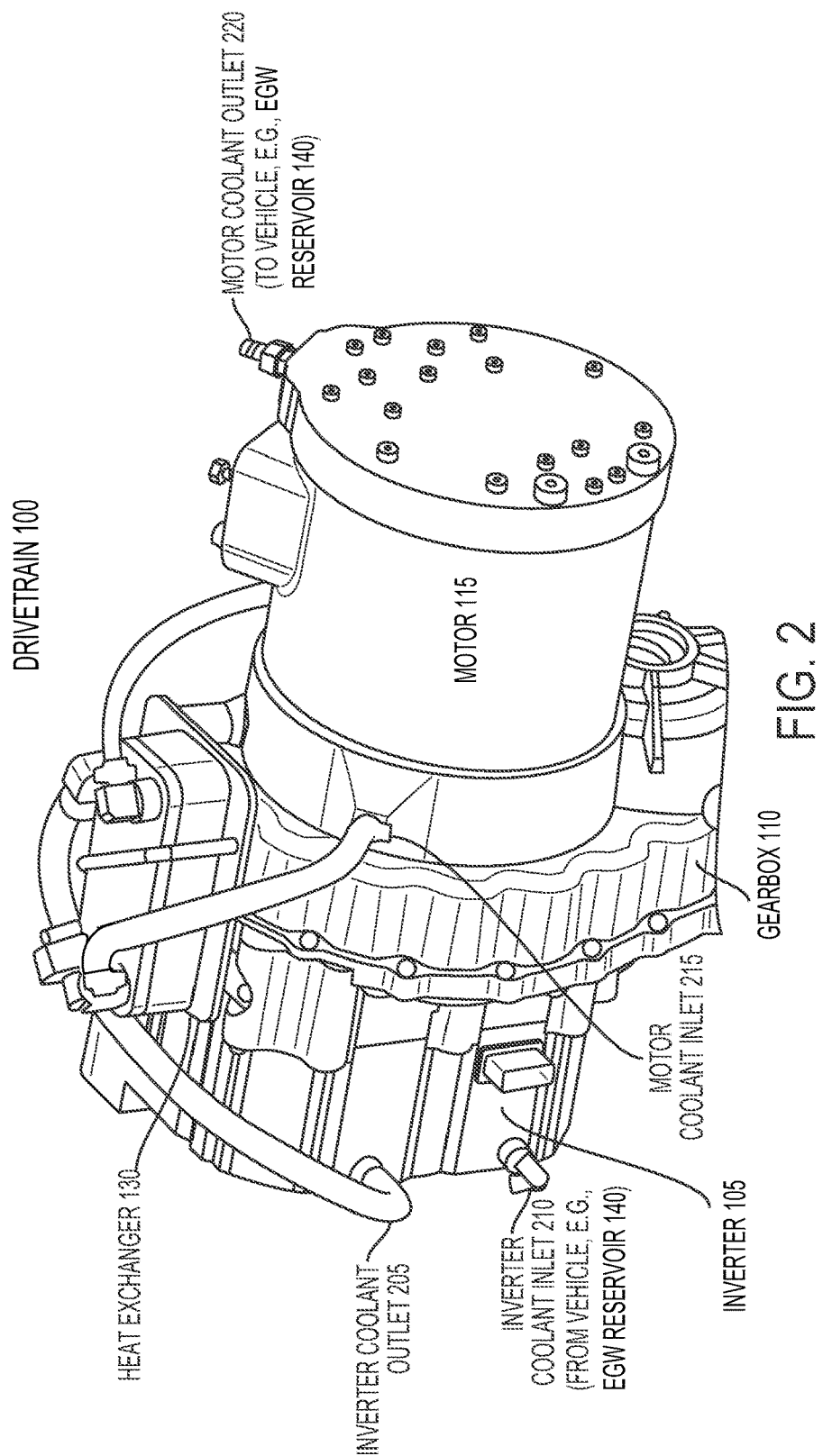
FIG. 2 is a perspective view of an example electric drivetrain system of a vehicle.

Referring to FIG. 2, among others, depicted is a perspective view of an example electric drivetrain system 100 of a vehicle. The drivetrain 100 can include an inverter 105, a gearbox 110 and a motor 115, similar to those described above in connection with at least FIG. 1. The relative positions of the inverter 105, the gearbox 110 and the motor 115 can correspond to the that depicted in FIG. 1, for example, with the gearbox 110 located between the inverter 105 and the motor 115. The heat exchanger 130 can be integrated with, or part of a gearbox plate that is located or installed on the gearbox 110. EGW can be supplied from an EGW reservoir 140 of the vehicle via an EGW pump 135 for instance, into the inverter 105 through an inverter coolant inlet 210. The EGW can absorb heat from the inverter 105 and exit the inverter 105 via an inverter coolant outlet 205. The inverter coolant outlet 205 is connected with a tube which can transport the EGW to the heat exchanger 130 for instance. The heat exchanger 130 can transfer heat carried by the oil loop to the EGW loop, and output EGW from the heat exchanger 130. The EGW output from the heat exchanger 130 can be channeled through a tube to a motor coolant inlet 215 of the motor 115, and be directed into the motor 115 to cool a region around the stator 195 for example. The EGW can remove heat from the motor 115 and exit the motor 115 via a motor coolant outlet 220. The EGW exiting the motor 115 can be channeled via a tube for instance, to the EGW reservoir of the vehicle.

Figure 3:
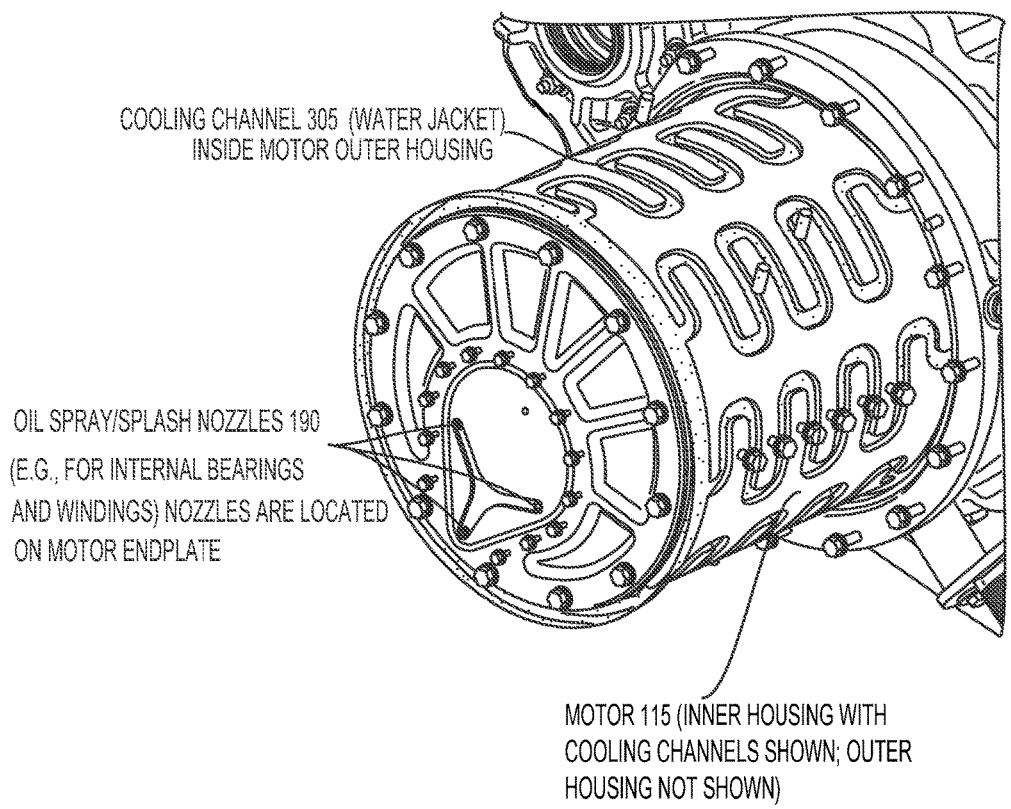
FIG. 3 is a perspective view of a portion of an example electric drivetrain system of a vehicle.

Referring to FIG. 3, among others, depicted is a perspective view of a portion of an example electric drivetrain system 100 of a vehicle. The portion shown can include components of a motor 115 of the drivetrain 100. A portion of the motor's housing 155 is shown removed by way of illustration, to expose cooling channel(s) 305 in the housing 155 around a stator 195 of the motor 115. The cooling channel(s) 305 are sometimes referred to as a water jacket, and can be inlaid, fabricated, machined or otherwise configured into a cylindrical structure around the stator 195 (e.g., in the housing 155). The cooling channel(s) 305 can for example be constructed from stator housing laminations, and the EGW can be provided via the housing 155. The cooling channel(s) 305 can carry or channel EGW or other coolant proximate to the stator 195 to absorb and remove heat from at least the stator region. The channel(s) can include a plurality of channels arranged to transport EGW from one circular end of the motor 115 to another circular end of the motor 115. The plurality of channels can be connected in parallel, with each channel meandering across the cylindrical structure (instead of in a straight direction) to provide coverage over a portion of the cylindrical surface, so that the cylindrical surface is substantially evenly covered by the plurality of coolant channels 305, to minimize significant thermal or cooling variations between segments of the cylindrical surface or the stator 195.

As shown, one end of the motor 155 can have a structure configured with nozzles 190 for spraying or splashing oil based coolant onto components of the motor 115, such as internal bearings 190, and windings on endplates of the motor's housing 155, to cool such components, and possibly lubricate the bearings 190.

A dual motor drivetrain system of a vehicle can include a first drive unit and a second drive unit. Each of the first drive unit and the second drive unit can include a drivetrain 100 with one or more components as described above in connection with at least FIG. 1. For example, each of the first drive unit and the second drive unit can comprise an electric drivetrain 100 that includes an inverter component 105, a gearbox component 110, and a motor component 115. Each of the first drive unit and the second drive unit can incorporate dual cooling loops, as described above in connection with at least FIG. 1 for example. The dual cooling loops can be extended across the drive units into a cooling network for cooling the dual motor drivetrain system. For instance, each of the first drive unit and the second drive unit can include a first cooling subsystem 120 using EGW based coolant. The first cooling subsystem 120 can include an EGW coolant loop 145 to distribute the EGW based coolant to remove heat from a housing 180 of the inverter component 105 and a housing 150 of the gearbox component 110, and a housing 155 of the motor component 155. Each of the first drive unit and the second drive unit can include a second cooling subsystem 125 using oil based coolant. The second cooling subsystem 125 can include an oil coolant loop 170 to distribute the oil based coolant to remove heat from internal components and the housing 150 of the gearbox component 110, and heat from internal components and the housing 155 of the motor component 115. The EGW coolant loop 145 of the first drive unit and the EGW coolant loop 145 of the second drive unit can be connected within a coolant network for distributing the EGW based coolant.

Figure 4:
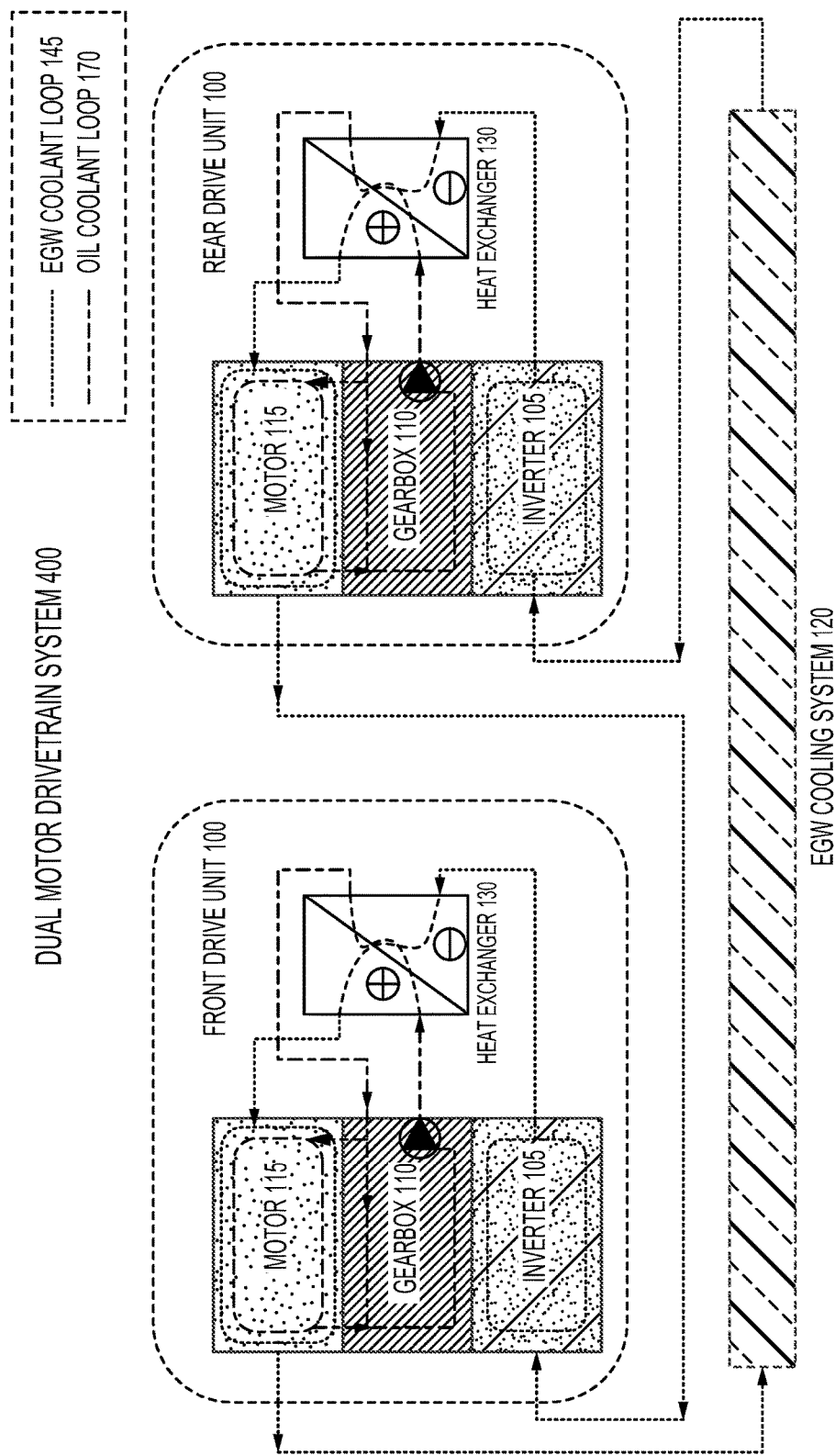
FIGS. 4-7 depict example configurations of dual loop cooling for dual motor drivetrain systems of a vehicle.

Referring to FIG. 4, among others, depicted is an example configuration of dual loop cooling for a dual motor drivetrain system 400 of a vehicle. The dual motor drivetrain system 400 can include a first drive unit 100 and a second drive unit 100. The first drive unit 100 can comprise a rear drive unit of the vehicle (e.g., to drive rear wheels of the vehicle), and the second drive unit can comprise a front drive unit of the vehicle (e.g., to drive front wheels of the vehicle). The first drive unit 100 and the second drive unit 100 can each include an EGW cooling subsystem 120 using EGW based coolant, both of which can be connected within a coolant network for distributing the EGW based coolant across the first drive unit 100 and the second drive unit 100. The dual motor drivetrain system 400 can include, share or use a single EGW cooling system 120. The EGW cooling system 120 can include an EGW coolant pump to control a flow of the EGW based coolant through the EGW coolant loop 145 of the first drive unit 100 and the EGW coolant loop 145 of the second drive unit 100. Each of the EGW coolant loop 145 can be disposed in a path through each drive unit (drivetrain 100) as described above in connection with at least FIG. 1 for example. The EGW coolant pump can be external to each of the first drive unit 100 and the second drive unit 100.

The dual cooling loops of each drive unit can be configuration to interoperate to cool the dual motor drivetrain system 400. In the configuration shown in FIG. 4 for example, the EGW coolant loop 145 of the first drive unit 100 and the EGW coolant loop 145 of the second drive unit 100 can be connected in series (FIG. 4) or parallel (FIG. 5) with respect to the EGW coolant pump 135. For example, the EGW coolant pump can supply EGW into an inlet end of the EGW coolant loop 145 of the first drive unit, and the EGW can therefore flow through the first drive unit 100. Upon circulating or flowing through the EGW coolant loop of the first drive unit 100, the EGW in the first drive unit 100 can exit via an outlet end of the EGW coolant loop 145 of the first drive unit 100. The outlet end of the EGW coolant loop 145 of the first drive unit 100 can be connected (e.g., in series) with an inlet end of the EGW coolant loop 145 of the second drive unit, and the EGW can therefore flow through the second drive unit 100. Upon circulating or flowing through the EGW coolant loop of the second drive unit 100, the EGW in the second drive unit 100 can exit via an outlet end of the EGW coolant loop 145 of the second drive unit 100. The outlet end of the EGW coolant loop 145 of the first drive unit 100 can be channeled to a EGW reservoir 140 of the EGW cooling system 120, which supplies the EGW coolant pump. Hence, EGW from the EGW coolant pump can flow in series through the first drive unit 100 and the second drive unit, or along the same or a similar path through each of the first drive unit 100 and the second drive unit for example. The order of the first drive unit 100 and the second drive unit can be reversed or switched, to allow EGW to flow through the second drive unit 100 and the first drive unit in series fashion.

The first drive unit 100 and the second drive unit 100 can each include or use a dedicated oil cooling subsystem 125 using oil based coolant, instead of sharing a single oil cooling subsystem 125 for instance. Each of the oil cooling subsystems 125 can include at least some components and features similar to those described above in connection with at least FIGS. 1-3 for instance. For example, each oil cooling subsystems 125 can include an oil coolant loop 170 disposed in a path through each drive unit (drivetrain 100) as described above in connection with at least FIG. 1 for example.

Figure 5:
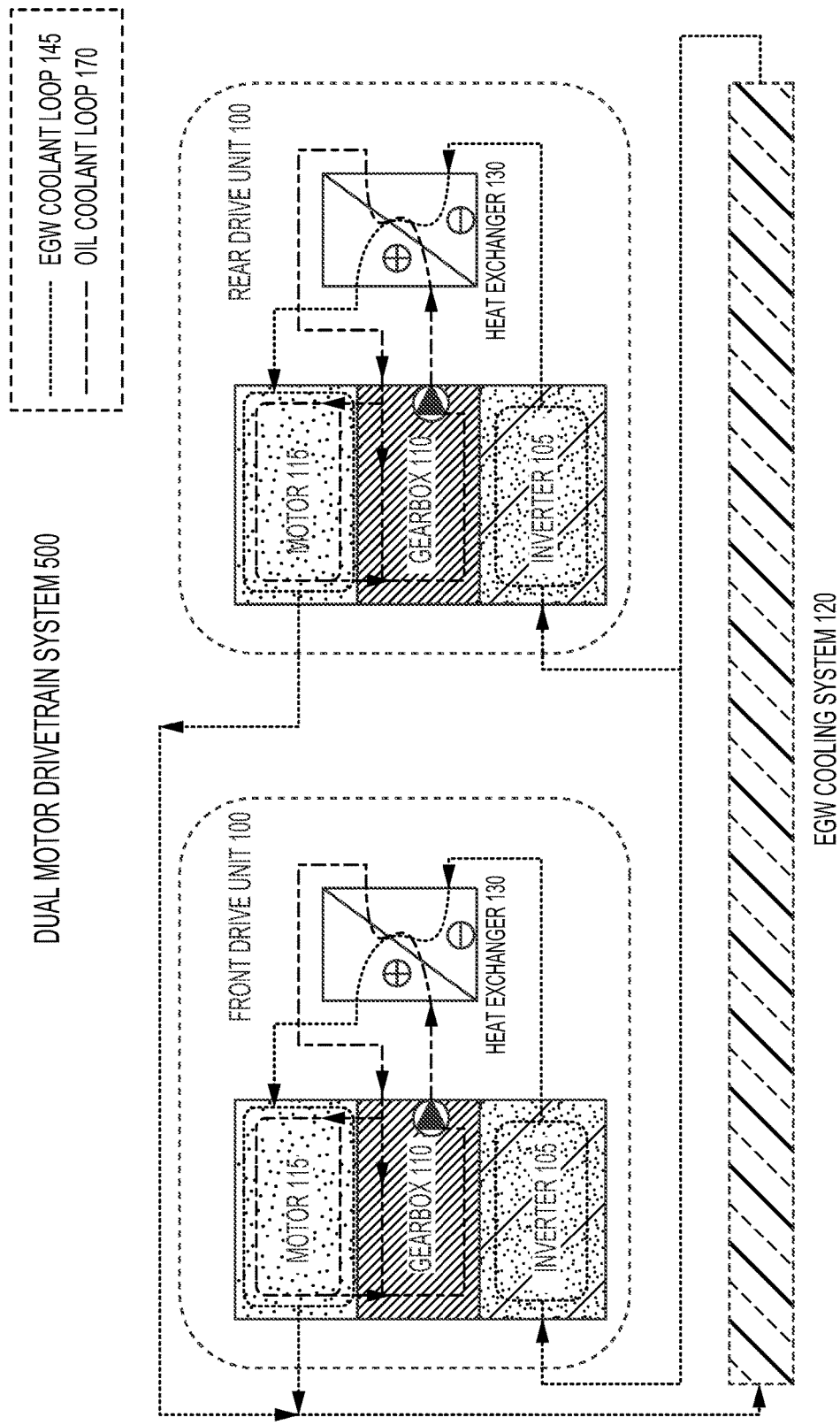

Referring to FIG. 5, among others, depicted is an example configuration of dual loop cooling for a dual motor drivetrain system 500 of a vehicle. The dual motor drivetrain system 500 can include a first drive unit 100 and a second drive unit 100. The first drive unit 100 can comprise a front drive unit of the vehicle (e.g., to drive front wheels of the vehicle), and the second drive unit can comprise a rear drive unit of the vehicle (e.g., to drive rear wheels of the vehicle). The first drive unit 100 and the second drive unit 100 can each include an EGW cooling subsystem 120 using EGW based coolant, both of which can be connected within a coolant network for distributing the EGW based coolant across the first drive unit 100 and the second drive unit 100. The dual motor drivetrain system 500 can include, share or use a single EGW cooling system 120. The EGW cooling system 120 can include an EGW coolant pump to control a flow of the EGW based coolant through the EGW coolant loop 145 of the first drive unit 100 and the EGW coolant loop 145 of the second drive unit 100. Each of the EGW coolant loop 145 can be disposed in a path through each drive unit (drivetrain 100) as described above in connection with at least FIG. 1 for example. The EGW coolant pump 135 can be external to each of the first drive unit 100 and the second drive unit 100.

The dual cooling loops of each drive unit can be configuration to interoperate to cool the dual motor drivetrain system 500. In the configuration shown in FIG. 5 for example, the EGW coolant loop 145 of the first drive unit 100 and the EGW coolant loop 145 of the second drive unit 100 can be connected in parallel with respect to the EGW coolant pump. For example, the EGW coolant pump can supply EGW into an inlet end of the EGW coolant loop 145 of the first drive unit, and into an inlet end of the EGW coolant loop of the second drive unit. The EGW can therefore flow in parallel through the first drive unit 100 and the second drive unit, or in the same direction through each of the first drive unit 100 and the second drive unit. Upon circulating or flowing through the respective EGW coolant loop, the EGW in the first drive unit 100 can exit via an outlet end of the EGW coolant loop 145 of the first drive unit 100, and the EGW in the second drive unit 100 can exit via an outlet end of the EGW coolant loop 145 of the second drive unit 100. The EGW can exit the respective outlet ends to be channeled to the same EGW reservoir 140 of the EGW cooling system 120.

The first drive unit 100 and the second drive unit 100 can each include or use a dedicated oil cooling subsystem 125 using oil based coolant, instead of sharing a single oil cooling subsystem 125 for instance. Each of the oil cooling subsystems 125 can include at least some components and features similar to those described above in connection with at least FIGS. 1-3 for instance. For example, each oil cooling subsystems 125 can include an oil coolant loop 170 disposed in a path through each drive unit (drivetrain 100) as described above in connection with at least FIG. 1 for example.

Figure 6:
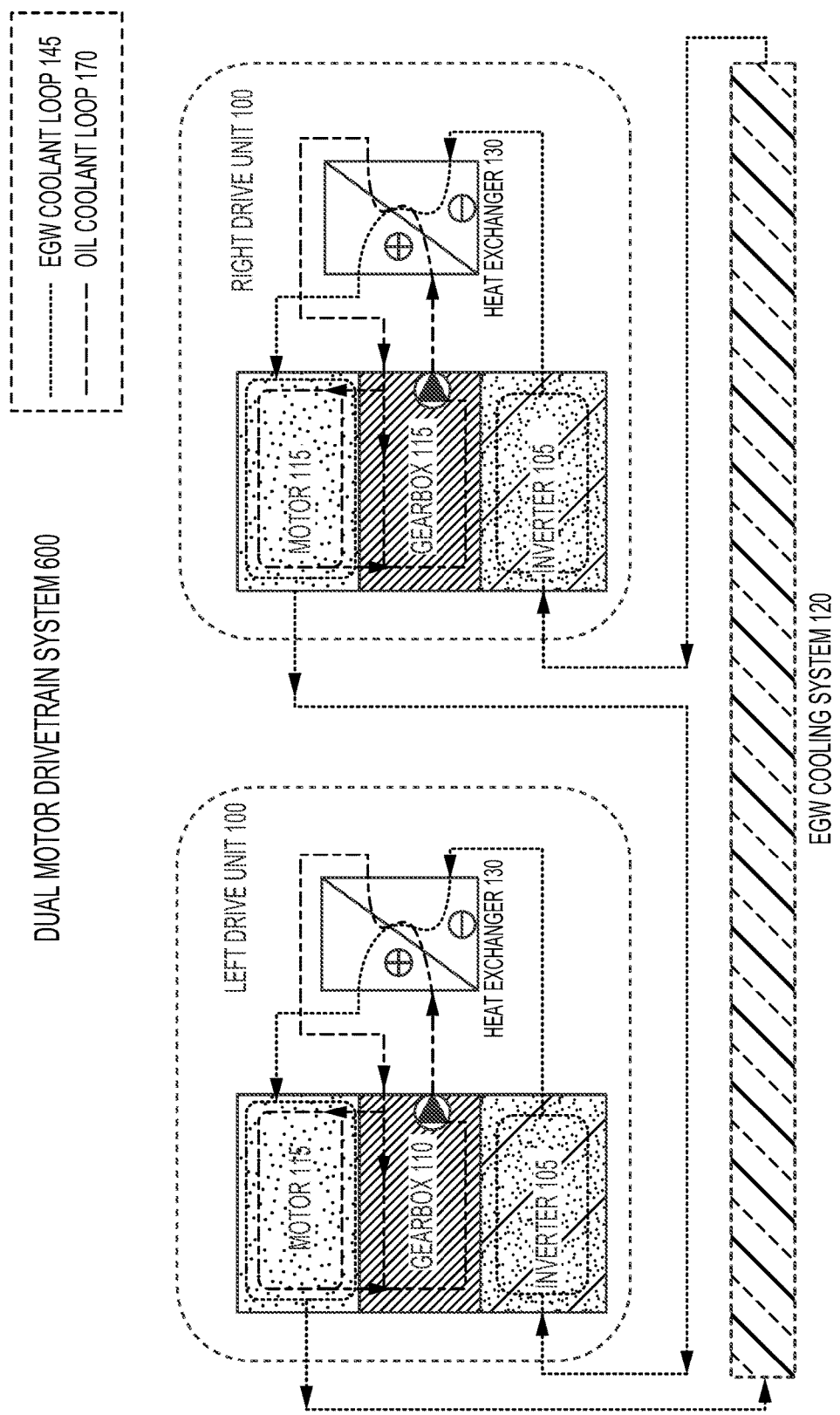

Referring to FIG. 6, among others, depicted is an example configuration of dual loop cooling for a dual motor drivetrain system 600 of a vehicle. The dual motor drivetrain system 600 can include a first drive unit 100 and a second drive unit 100. The first drive unit 100 can comprise a right drive unit of the vehicle (e.g., to drive right wheels of the vehicle), and the second drive unit can comprise a left drive unit of the vehicle (e.g., to drive left wheels of the vehicle). The left and right drive units can be structurally connected from left to right, side by side, or separately from left to right. The first drive unit 100 and the second drive unit 100 can each include an EGW cooling subsystem 120 using EGW based coolant, both of which can be connected within a coolant network for distributing the EGW based coolant across the first drive unit 100 and the second drive unit 100. The dual motor drivetrain system 600 can include, share or use a single EGW cooling system 120. The EGW cooling system 120 can include an EGW coolant pump to control a flow of the EGW based coolant through the EGW coolant loop 145 of the first drive unit 100 and the EGW coolant loop 145 of the second drive unit 100. Each of the EGW coolant loop 145 can be disposed in a path through each drive unit (drivetrain 100) as described above in connection with at least FIG. 1 for example. The EGW coolant pump can be external to each of the first drive unit 100 and the second drive unit 100.

The dual cooling loops of each drive unit can interoperate to cool the dual motor drivetrain system 600. In the configuration shown in FIG. 6 for example, the EGW coolant loop 145 of the first drive unit 100 and the EGW coolant loop 145 of the second drive unit 100 can be connected in series with respect to the EGW coolant pump. For example, the EGW coolant pump can supply EGW into an inlet end of the EGW coolant loop 145 of the first drive unit, and the EGW can therefore flow through the first drive unit 100. Upon circulating or flowing through the EGW coolant loop of the first drive unit 100, the EGW in the first drive unit 100 can exit via an outlet end of the EGW coolant loop 145 of the first drive unit 100. The outlet end of the EGW coolant loop 145 of the first drive unit 100 can be connected (e.g., in series) with an inlet end of the EGW coolant loop 145 of the second drive unit, and the EGW can therefore flow through the second drive unit 100. Upon circulating or flowing through the EGW coolant loop of the second drive unit 100, the EGW in the second drive unit 100 can exit via an outlet end of the EGW coolant loop 145 of the second drive unit 100. The outlet end of the EGW coolant loop 145 of the first drive unit 100 can be channeled to a EGW reservoir 140 of the EGW cooling system 120, which supplies the EGW coolant pump. Hence, EGW from the EGW coolant pump can flow in series through the first drive unit 100 and the second drive unit, or along the same or a similar path through each of the first drive unit 100 and the second drive unit for example. The order of the first drive unit 100 and the second drive unit can be reversed or switched, to allow EGW to flow through the second drive unit 100 and the first drive unit in series fashion.

The first drive unit 100 and the second drive unit 100 can each include or use a dedicated oil cooling subsystem 125 using oil based coolant, instead of sharing a single oil cooling subsystem 125 for instance. Each of the oil cooling subsystems 125 can include at least some components and features similar to those described above in connection with at least FIGS. 1-3 for instance. For example, each oil cooling subsystems 125 can include an oil coolant loop 170 disposed in a path through each drive unit (drivetrain 100) as described above in connection with at least FIG. 1 for example.

Figure 7:
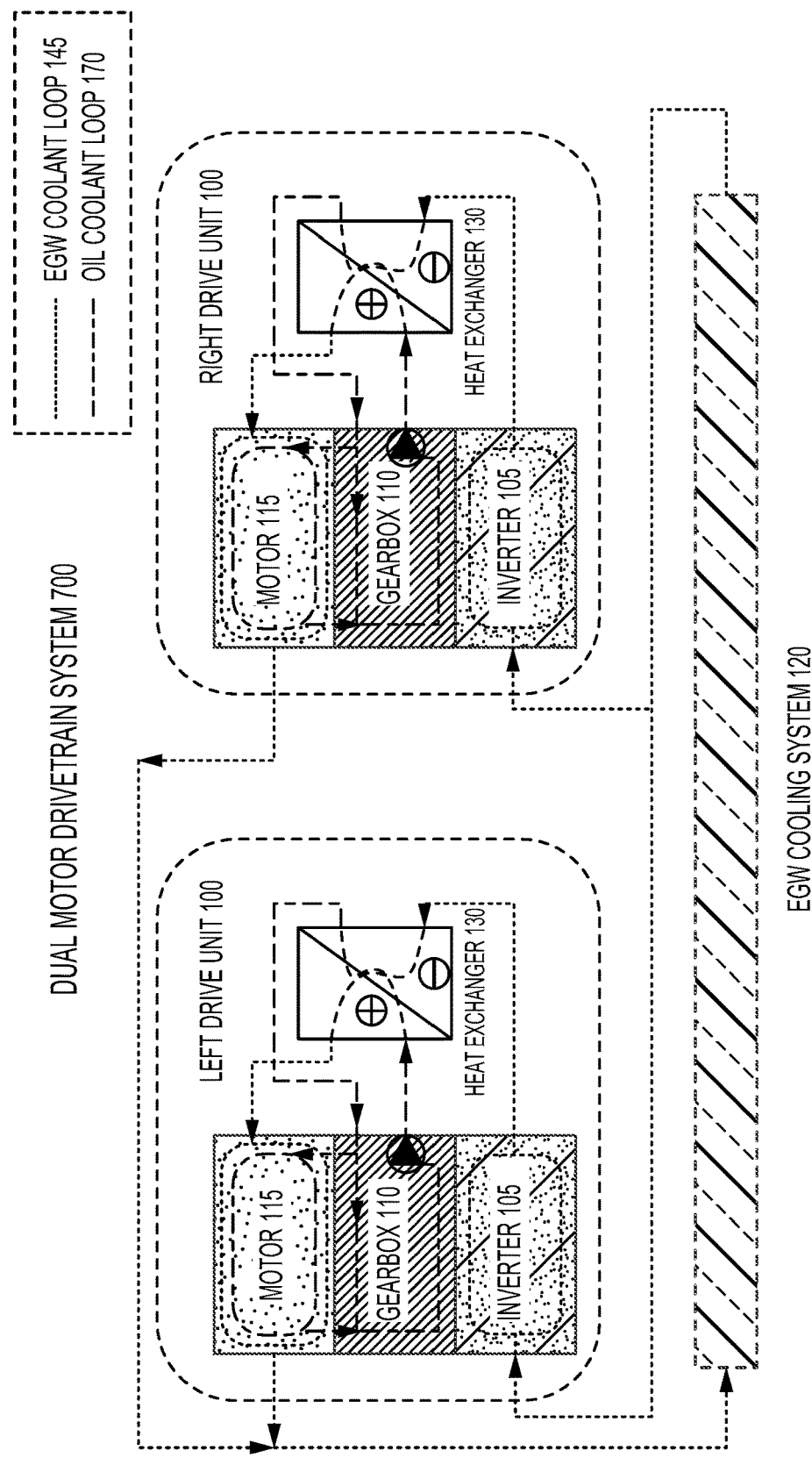

Referring to FIG. 7, among others, depicted is an example configuration of dual loop cooling for a dual motor drivetrain system 700 of a vehicle. The dual motor drivetrain system 700 can include a first drive unit 100 and a second drive unit 100. The first drive unit 100 can comprise a left drive unit of the vehicle (e.g., to drive left wheels of the vehicle), and the second drive unit can comprise a right drive unit of the vehicle (e.g., to drive right wheels of the vehicle). The left and right drive units can be structurally connected from left to right, side by side, or separately from left to right. The first drive unit 100 and the second drive unit 100 can each include an EGW cooling subsystem 120 using EGW based coolant, both of which can be connected within a coolant network for distributing the EGW based coolant across the first drive unit 100 and the second drive unit 100. The dual motor drivetrain system 700 can include, share or use a single EGW cooling system 120. The EGW cooling system 120 can include an EGW coolant pump to control a flow of the EGW based coolant through the EGW coolant loop 145 of the first drive unit 100 and the EGW coolant loop 145 of the second drive unit 100. Each of the EGW coolant loop 145 can be disposed in a path through each drive unit (drivetrain 100) as described above in connection with at least FIG. 1 for example. The EGW coolant pump can be external to each of the first drive unit 100 and the second drive unit 100.

The dual cooling loops of each drive unit can be configuration to interoperate to cool the dual motor drivetrain system 700. In the configuration shown in FIG. 5 for example, the EGW coolant loop 145 of the first drive unit 100 and the EGW coolant loop 145 of the second drive unit 100 can be connected in parallel with respect to the EGW coolant pump. For example, the EGW coolant pump can supply EGW into an inlet end of the EGW coolant loop 145 of the first drive unit, and into an inlet end of the EGW coolant loop of the second drive unit. The EGW can therefore flow in parallel through the first drive unit 100 and the second drive unit, or in the same direction through each of the first drive unit 100 and the second drive unit. Upon circulating or flowing through the respective EGW coolant loop, the EGW in the first drive unit 100 can exit via an outlet end of the EGW coolant loop 145 of the first drive unit 100, and the EGW in the second drive unit 100 can exit via an outlet end of the EGW coolant loop 145 of the second drive unit 100. The EGW can exit the respective outlet ends to be channeled to the same EGW reservoir 140 of the EGW cooling system 120.

The first drive unit 100 and the second drive unit 100 can each include or use a dedicated oil cooling subsystem 125 using oil based coolant, instead of sharing a single oil cooling subsystem 125 for instance. Each of the oil cooling subsystems 125 can include at least some components and features similar to those described above in connection with at least FIGS. 1-3 for instance. For example, each oil cooling subsystems 125 can include an oil coolant loop 170 disposed in a path through each drive unit (drivetrain 100) as described above in connection with at least FIG. 1 for example.

A series configuration of drive units (or EGW cooling loops), for example as described above, can reduce manufacturing costs and structural complexity as compared to a parallel configuration of drive units (or EGW cooling loops). A parallel configuration), for example as described above, can require more components (and a higher corresponding cost) to setup than a series configuration, but can be comparatively more efficient. A series configuration of drive units (or EGW cooling loops) can result in a larger temperature (and pressure) drop across the inlet end of the first EGW cooling loop (connected to the EGW pump output) and the outlet end of the second EGW cooling loop, as compared to that across inlet and output ends of each EGW cooling loop in a parallel configuration of drive units (or EGW cooling loops). In terms of cooling performance where minimizing the temperature and pressure drop is preferred, a parallel configuration may be preferred. Due to the larger pressure drop in a series configuration relative to that of a parallel configuration, the EGW pump can operate less efficiently in a series configuration than in a parallel configuration.

In an integrated drivetrain 100 that has an inverter 105, a gearbox 110 and a motor 115, various physical and build configurations for integrating these components are possible. For example, FIG. 1 shows an example configuration in which the gearbox 110 is located in the middle, with the inverter 105 and the motor 115 mounted on either side of gearbox 110. In another configuration, the inverter 105 can be mounted on top of the motor 115, and the gearbox 110 can be mounted on a side of the motor 115, for instance as shown in FIGS. 8-10.

Figure 8:
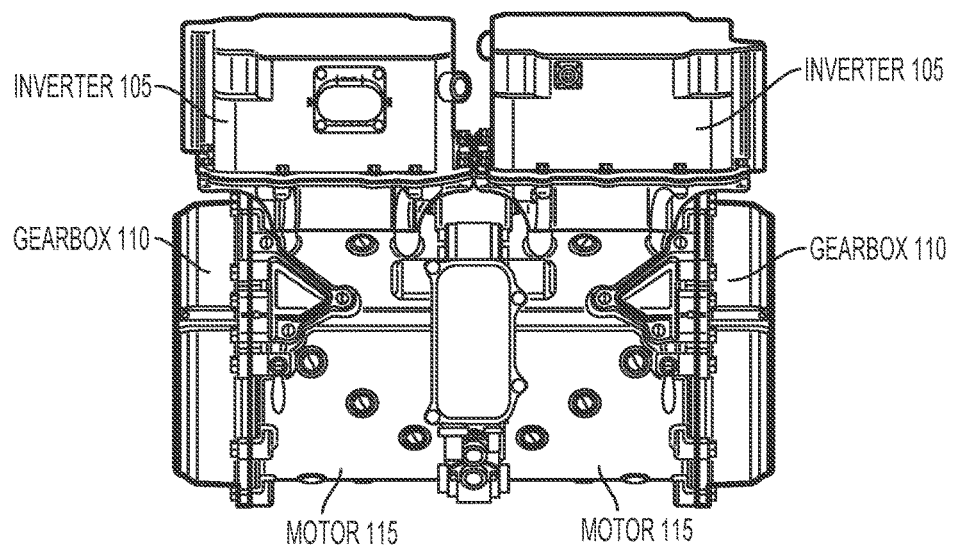
FIG. 8 a perspective view of an example configuration of a dual motor drivetrain system.
Figure 9:
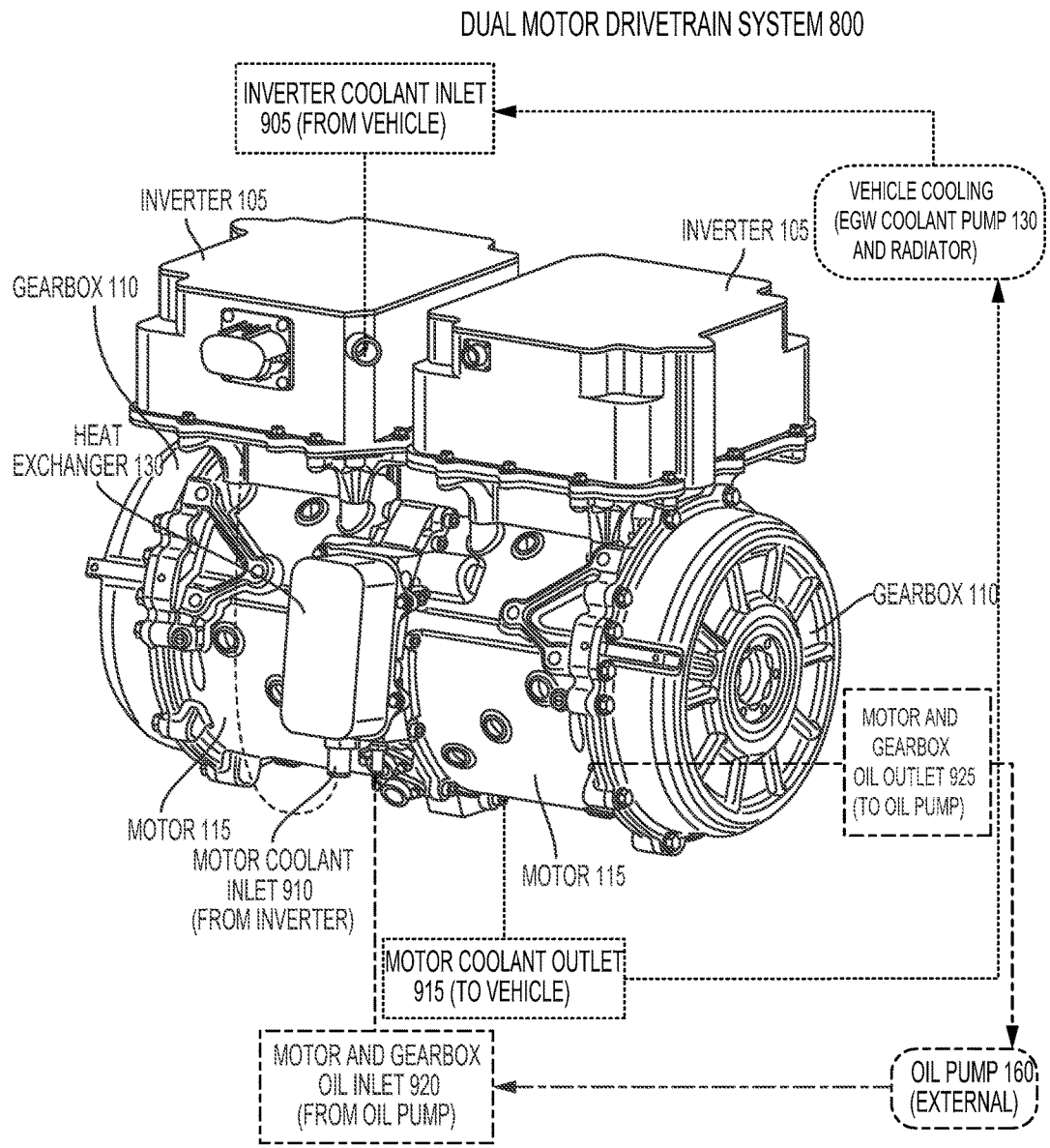
FIG. 9 a perspective view of an example configuration of a dual motor drivetrain system.
Figure 10:
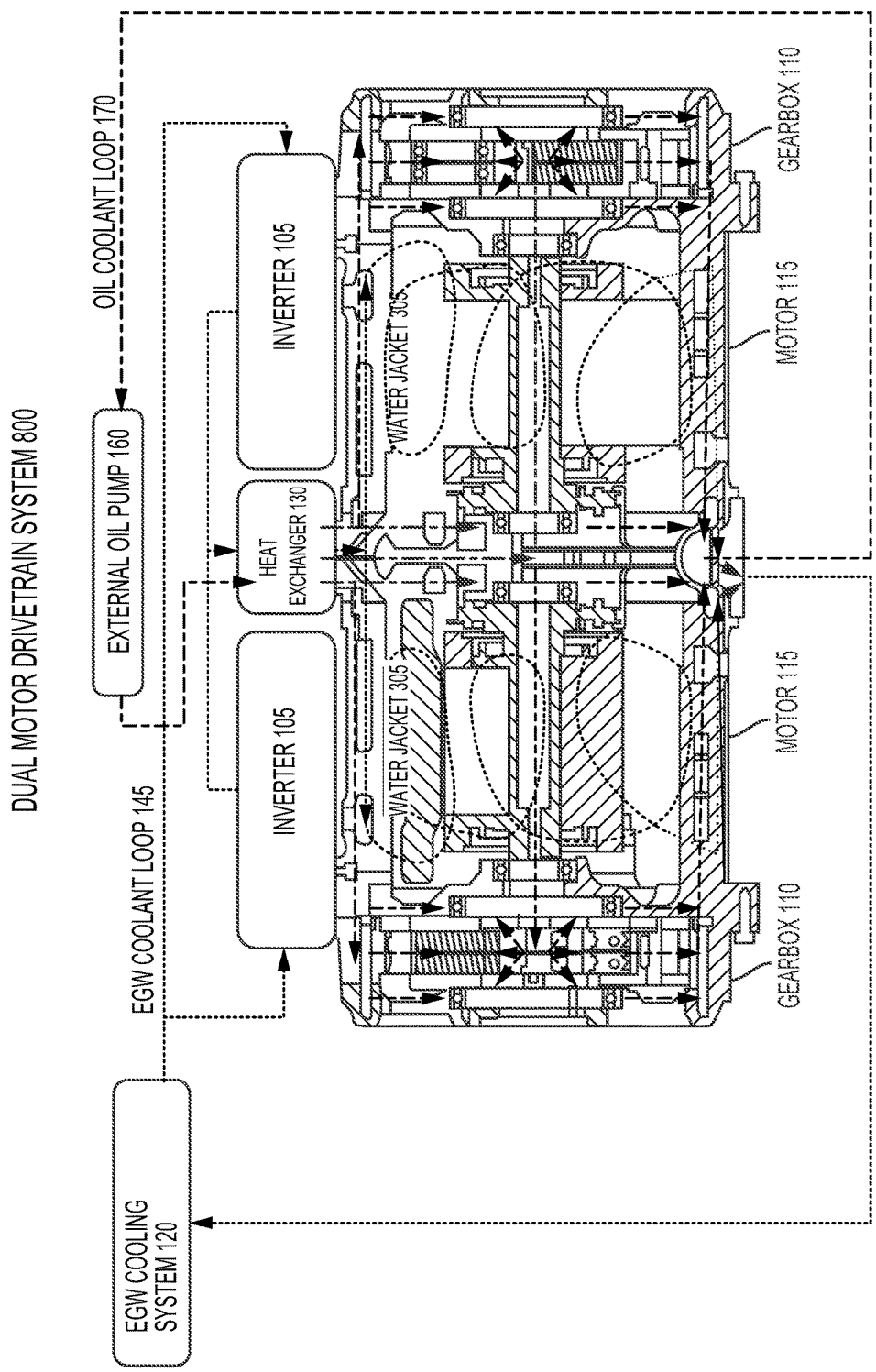
FIG. 10 a perspective view of an example configuration of a dual motor drivetrain system.

FIGS. 8-10, among others, depict an example configuration of a dual motor drivetrain system 800. The dual motor drivetrain system 800 can have a first drive unit 100 and a second drive unit 100, which can collectively provide dual motors 115, dual inverters 105 and dual gearboxes 110. The dual motor drivetrain system 800 can incorporate one or more components and features of the dual motor drivetrain systems discussed above in connection with at least FIGS. 4-7 for example. As shown in FIGS. 8-10, among others, the first drive unit 100 and the second drive unit 100 are integrated or mounted together, instead of being separated. The dual motors 115 can be mounted back to back (or side by side). Each inverter 105 can be paired with and mounted on top of a corresponding motor 115. Each gearbox 110 can be integrated with a corresponding motor 115 on a side of the corresponding motor 115 for example.

Referring to FIG. 9, among others, depicted is a perspective schematic view of an example configuration of a dual motor drivetrain system 800. The dual motor drivetrain system 800 can have a first drive unit 100 and a second drive unit 100. The first drive unit 100 and the second drive unit 100 can be integrated or mounted together, instead of being separated. Instead of each drive unit having its own dedicated oil coolant system 125 and oil pump 160, both drive units can share or use a single, external oil coolant system 125 and oil pump 160. The oil pump 160 can supply oil from an external oil coolant loop 170 for instance, to the dual motor drivetrain system 800 via a motor and gearbox oil inlet 920 for example. The oil can be distributed through respective housings of the motors 115 for example, to each gearbox 110 on either side. The oil can then be passed through each gearbox 110, which can include locations with nozzles for spraying or splashing oil directly onto components within each gearboxes 110. The oil distributed through the respective housings of the motors 115 can also be passed to cool endplates and bearings on either side of each motor 115 for example. The oil can exit each motor 115 via a respective motor and gearbox oil outlet 925 for example, to a reservoir or the shared external oil pump 160.

Both drive units can share or use a single, external EGW coolant system 120 and EGW pump 135. The EGW pump 135 of the EGW coolant system 120 can supply EGW to the inverters 105 via one or more inverter coolant inlets 905 for instance. The EGW can exit the inverters 105 and be fed to the motors 115 via one or more motor coolant inlets 910 on a heat exchanger 130. The EGW can exit the motors 115 via one or more motor coolant outlets 915 for example, to a reservoir or the EGW pump 135 of the shared EGW cooling system 120. A radiator can be located at or near the EGW pump 135 to transfer at least some of the heat carried by the EGW away from the dual motor drivetrain system 800.

Referring to FIG. 10, among others, depicted is a cross-sectional schematic view of an example configuration of a dual motor drivetrain system 800. The dual motor drivetrain system 800 can have a first drive unit 100 and a second drive unit 100. The first drive unit 100 and the second drive unit 100 can be integrated or mounted together, instead of being separated. Instead of each drive unit having its own dedicated oil coolant system 125 and oil pump 160, both drive units can share or use a single, external oil coolant system 125 and oil pump 160. The oil pump 160 can supply oil from an external oil coolant loop 170 for instance, to the dual motor drivetrain system 800 via a shared heat exchanger 130 for example. The oil can be distributed through respective housings of the motors 115 for example, to each the gearbox 110 on either side. The oil can then be passed through each gearbox 110, which can include locations with nozzles for spraying or splashing oil directly onto components within each gearboxes 110. The oil distributed through respective housings of the motors 115 can also be passed down to endplates and bearings on either side of each motor 115 for example. The oil can be collected at the bottom of the gearboxes 110 and motors 115 for instance, and passed out from an outlet of the dual motor drivetrain system 800 to a reservoir of the shared oil cooling system 125 via the shared external oil coolant loop 170.

Both drive units can share or use a single, external EGW coolant system 120, EGW pump 135, and external EGW coolant loop 145. The EGW pump 135 of the EGW coolant system 120 can supply EGW via the external EGW coolant loop 145 to both inverters 105 for instance. The EGW can exit each of the inverters 105 and be fed through the shared heat exchange 130 located above the jointed (or back to back) portion of both motors 115. The EGW can exit the heat exchanger 130 and be channeled through respective housings (via water jackets or cooling channels 305 in the housings) of the motors 115 for example. The EGW can exit the motors 115 through an EGW outlet of the dual motor drivetrain system 800 to a reservoir of the shared EGW cooling system 120.

Figure 11:
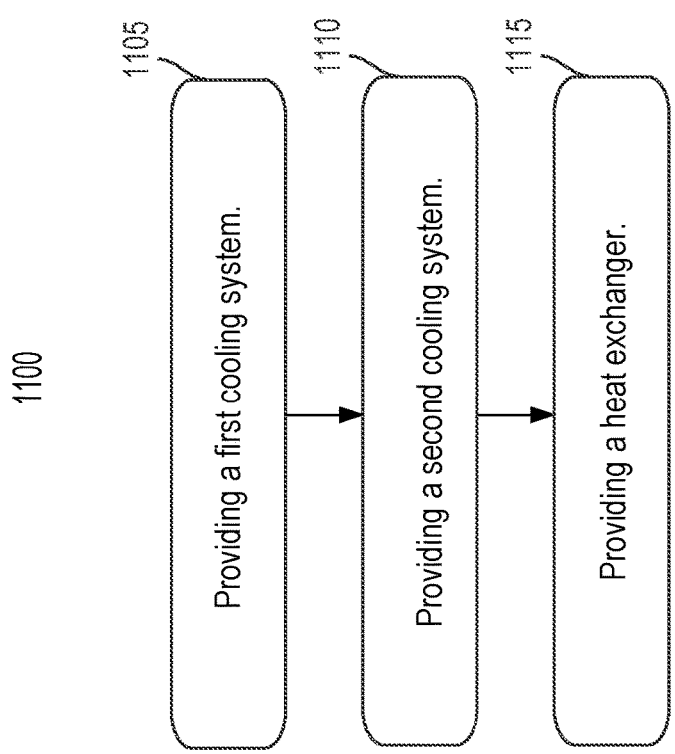
FIG. 11 is a flow diagram depicting an example method for liquid cooling an electric drivetrain system of a vehicle.

FIG. 11 depicts an example method 1100 of liquid cooling an electric drivetrain system of a vehicle. The method 1100 can include providing a first cooling system (ACT 1105). The method 1100 can include providing a second cooling system (ACT 1110). The method 1100 can include providing a heat exchanger (ACT 1115). The electric drivetrain system 100 can include one or more components and features of the drivetrain 100 discussed above in connection with at least FIGS. 1-3 for example. For instance, the electric drivetrain system 100 can include a motor component 115, an inverter component 105 and a gearbox component 110. The motor component 115 and the inverter component 105 can reside on a same side of the gearbox component 110, or on different sides of the gearbox component 110. For example, the motor component 115 and the inverter component 105 can reside on a same side of the gearbox component 110, and the inverter component 105 is mounted on a top or bottom side of the motor component 115. The motor component 115 and the inverter component 105 can reside on different sides of the gearbox component 110, and the inverter component 105 is mounted on a top or bottom side of the gearbox component 110.

The method 1100 can include providing a first cooling system 120 (ACT 1105). The method can include providing a first cooling system (or EGW cooling system) 120 using ethylene glycol and water (EGW) based coolant. The EGW cooling system 120 can include an EGW pump 135 and an EGW reservoir 140. The EGW cooling system 120 can be operably coupled (e.g., via coolant tubes) to an EGW pump 135 and an EGW reservoir 140, which can be external to the drivetrain 100 for example. The EGW reservoir 140 can store, hold or circulate an amount of EGW based coolant for use in the EGW cooling system 120. The EGW pump 135 can provide or pump EGW from the EGW reservoir 140, into one end (or an inlet of) the EGW coolant loop 145 for circulation across portions of the drivetrain 100. The EGW coolant loop 145 can circulate or return the EGW pumped into the EGW coolant loop 145, to the EGW reservoir 140 at another end (or an outlet) of the EGW coolant loop 145.

The first cooling system 120 can include an EGW coolant loop 145 to distribute the EGW based coolant to remove heat from various components of the drivetrain 100, such as from a housing 180 of the inverter component 105 and a housing 150 of the gearbox component 110, and a housing 155 of the motor component 115. The EGW coolant loop 145 can be disposed in a path through the cold plate 175 of the inverter component 105, the housing 150 of the gearbox component 110, the heat exchanger 130, and the housing 155 of the motor component 115. The EGW coolant loop 145 can be disposed in a path passing through or passing proximate to one or more of the following portions of the drivetrain 100 using one or more coolant tubing, pipes, grooves and channels: EGW reservoir 140, EGW pump 135, housing 180, cold plate 175 (internal to inverter 175 or in housing 180), housing 180, housing (or cold plate) 150, heat exchanger 130, housing (or cold plate) 150, housing (or cold plate) 155, rotor 198, EGW reservoir 140. An example path for the EGW coolant loop 145 is depicted in dotted line form in FIG. 1. The path can pass through or proximate to these portions in the sequence indicated above, along a direction of flow of the EGW, or in a different sequence. For example, depending on how the inverter 105, the gearbox 110 and the motor 115 are arranged relative to one another, the path through the components can be different. For instance, where the motor 115 and the inverter 105 are integrated to be on a same side relative to the gearbox 110 (e.g., inverter 105 stacked on motor 115), a section of the path can pass or connect directly between a component of the inverter 105 and a component of the motor 115.

The path can also pass through or pass proximate to one or more housing interfaces, e.g., between the inverter 105 and the gearbox 110, and between the gearbox 110 and the motor 115. Such housing interfaces can function as cold plates. In some implementations, the path can exclude one or more of any of the portions listed or identified above, and can include other portion(s) of the drivetrain 100 and possibly other portion(s) of the host vehicle. For example, in some implementations, it can be optional for the path to pass through or pass proximate to one or more of the housing interfaces and the rotor 198.

The method 1100 can include providing a second cooling system (or oil cooling system) 125 (ACT 1110). The method can include providing a second cooling system 125 using oil based coolant. The oil cooling system 125 can be operably coupled (e.g., via coolant tubes) to an oil pump 160 and an oil reservoir 165, both of which can be internal to the drivetrain 100 for example. The second cooling system 125 can include an oil coolant loop 170 to distribute the oil based coolant to remove heat from various components of the drivetrain 100, such as from internal components and the housing 150 of the gearbox component 110, and heat from internal components and the housing 155 of the motor component 115. The oil pump 160 can provide or pump oil from the oil reservoir 165, into one end (or an inlet of) the oil coolant loop 170 for circulation across portions of the drivetrain 100. The oil coolant loop 170 can circulate or return the oil pumped into the oil coolant loop 170, to the oil reservoir 165 at another end (or an outlet) of the oil coolant loop 165.

The oil coolant loop 170 can be disposed in a path through a coolant jacket for the housing 155 of the motor component 115, and a path through a rotor component 198 of the motor component 115. The oil coolant loop 165 can be disposed in a path (e.g., oil path) passing through or passing proximate to one or more of the following portions of the drivetrain 100 using one or more coolant tubing, pipes, grooves and channels: oil reservoir 165, oil pump 160, housing 180, housing (or cold plate) 150, heat exchanger 130, gears 183 and bearings 185, housing (or cold plate) 150, housing (or cold plate) 155, end plates of the motor component 115, portions of the rotor 198 and stator 195, EGW reservoir 140. An example oil path for the oil coolant loop 165 is depicted in dashed line form in FIG. 1. The oil path can pass through or proximate to these portions in the sequence indicated above, along a direction of flow of the oil, or in a different sequence. For example, depending on how the inverter 105, the gearbox 110 and the motor 115 are arranged relative to one another, the path through the components can be different. For instance, where the motor 115 and the inverter 105 are integrated to be on a same side relative to the gearbox 110 (e.g., inverter 105 stacked on motor 115), a section of the oil path can pass or connect directly between a component of the inverter 105 and a component of the motor 115.

The oil path can also pass through or pass proximate to one or more housing interfaces, e.g., between the inverter 105 and the gearbox 110, and between the gearbox 110 and the motor 115. In some implementations, the oil path can exclude one or more of any of the portions listed or identified above, and can include other portion(s) of the drivetrain 100 and possibly other portion(s) of the host vehicle. For example, in some implementations, it can be optional for the oil path to pass through or pass proximate to one or more of the housing interfaces and the end plates of the motor 115.

The oil pump 160 can control a flow of the oil based coolant through the oil coolant loop 170. The reservoir 165 of the oil based coolant can be located at least at a lower region of the gearbox component 110. The oil coolant pump 160 can deliver the oil based coolant from the reservoir 165 into the oil coolant loop 145. The second cooling system 125 can include one or more nozzles 190 supplied by the oil coolant loop 145 to spray or splash a portion of the oil based coolant onto one or more gears 183 of the gearbox component 110. The reservoir 165 can at least be located at a lower region of the gearbox component 110 to collect oil based coolant coming off the one or more gears 183 of the gearbox component 110.

The second cooling system 125 can include one or more nozzles 190 supplied by the oil coolant loop 145 along the path through the rotor component 198, to spray or splash a portion of the oil based coolant onto at least one of a portion of the rotor component 198 or a portion of a stator component 195 of the motor component 115. A reservoir 165 at least located at a lower region of the motor component 115 can collect oil based coolant coming off the at least one of the portion of the rotor component 198 or the portion of a stator component 195.

The oil coolant pump 160 can be operably coupled to a differential gear 183B of the gearbox component 110 to control the flow of the oil based coolant through the oil coolant loop 145. The flow of the oil based coolant can vary at least based on a rotational speed of the differential gear 183A. The oil pump 160 can be a mechanical pump (e.g., internal to the drivetrain 100 or gearbox 110), that can be driven or controlled by the differential gear 183B (via a pump gear 184D) of the gearbox 110. Due to the low rotational speed of the differential gear 183 at low motor or vehicle speed, the oil pump 160 can have a low pump speed (and low oil flow rate, e.g., 0.5 lpm) at a low motor or vehicle speed (e.g., 5 miles per hour). At a comparatively higher motor or vehicle speed (e.g., 60 miles per hour), because of the correspondingly high rotational speed of the differential gear 183, the oil pump 160 can have a high pump speed (and high oil flow rate, e.g., 18 lpm). As such, at the low motor or vehicle speed, the EGW cooling system 120 can increase its coolant flow for sufficient cooling to certain portions of the drivetrain 100 (e.g., the motor 115) to compensate for the low pump speed of the oil pump 160.

The EGW coolant pump (or EGW pump) 135 can control or adjust a flow of the EGW based coolant through the EGW coolant loop 145. The EGW coolant pump 135 can have a pump controller in communication with the second cooling system 125 or the oil coolant pump 160. The pump controller can adjust the flow of the EGW based coolant through the EGW coolant loop 145 when the second coolant system 125 or oil coolant pump 160 is operating at a coolant flow rate or a heat removal rate below a defined threshold. For example, the EGW pump 135 can be managed or controlled by an ECU of the host vehicle, via the pump controller, to set or adjust a flow rate and a direction of the EGW in the EGW coolant loop 145, or in a portion (e.g., a branched portion) of the EGW coolant loop 145 for instance. For example, a plurality of heat, temperature or infra-red sensors can be disposed at locations on or near various components of the drivetrain 100, to collect information about the temperature or heat dissipation at each respective location.

A sensor monitoring the cold plate 175 for instance, can transmit the collected information to the ECU, which can compare the collected information to a defined threshold or operating range for the inverter 105 at the location of the cold plate 175. If the ECU determines, based on the collected information, that the temperature or heat generated at the location of the cold plate 175 is beyond the defined threshold or operating range, the ECU can send a signal or instruction to the pump controller to increase a flow rate of the EGW (to 20 lpm for instance) to the cold plate 175. When the temperature or heat generated at the location of the cold plate 175 is determined by the ECU (based on further information collected by the sensor) to be within the defined threshold or operating range, the ECU can send a signal or instruction to the pump controller of the EGW pump 135, to adjust a flow rate of the EGW (to 10 lpm for instance) to the cold plate 175.

The pump controller can be in communication with the second cooling system (or oil cooling system) 125, for example to adjust a flow rate of the EGW based coolant through the EGW coolant loop 145 when the second cooling system 125 is operating at a coolant flow rate or a heat removal rate below a defined threshold (e.g., of 5 lpm or 2.5 KW, respectively). For example, an operations monitor of the oil cooling system 125 can send a message to the pump controller, indicating a coolant flow rate, a heat removal rate or an operating state (e.g., inactive, low flow operation, or high flow operation) of the oil cooling system. For instance, the operations monitor can determine that the oil cooling system 125 is in a state of low flow operation (e.g., below 2 lpm) based on a rotational speed of a differential gear of the gearbox 110 coupled to or controlling the oil pump 160, and can determine that the EGW cooling system 120 should increase its rate of heat removal from drivetrain components to compensate for the low rate of heat removal by the oil cooling system 125. The pump controller can process the message to determine whether to adjust a flow rate or a direction of the EGW for instance.

Alternatively, the operations monitor of the oil cooling system 125 can send a request or instruction to the pump controller to adjust a flow rate (e.g., to a certain flow rate, such as 20 lpm) or a direction (e.g., forward or reverse direction) of the EGW for instance. In certain implementations, the operations monitor of the oil cooling system 125 does not communicate directly with the pump controller, but rather via the ECU that manages or controls the EGW pump 135. For example, instead of the pump controller receiving the message, request or instruction from the operations monitor as discussed above, the ECU receives the message, request or instruction from the operations monitor, determines an adjustment (e.g., flow rate, direction) for the pump controller to make, and instructs the pump controller to make the adjustment.

The method 1100 can include providing a heat exchanger 130 (ACT 1115). The method can include providing a heat exchanger 130 to remove heat from the oil coolant loop 170 to the EGW coolant loop 145, away from the electric drivetrain 100, to transfer to a vehicle cooling system 122 having a radiator. The heat exchanger 130 can be in a path of each of the oil coolant loop 170 and the EGW coolant loop 145. The EGW coolant loop 145 can transfer the heat from the various components of the drivetrain 100, to be removed, dissipated, radiated or otherwise transferred away from the drivetrain 100. The oil coolant loop 170 can transfer the heat from the various components of the drivetrain 100 to the heat exchanger 130, to be removed, dissipated, radiated or otherwise transferred away from the drivetrain 100. The heat exchanger 130 can incorporate a fluid transfer and cooling mechanism to extract heat carried in the oil coolant loop 170 and/or the EGW coolant loop 145. The heat exchanger 130 can be coupled to a radiator system of the host vehicle (e.g., via the EGW coolant loop 145). The heat exchanger 130 can incorporate one or more heatsinks, fins or air-cooling or radiative structures, to facilitate transfer of the heat away from the drivetrain 100. The heat exchanger 130 can incorporate one or more fans or other forced air devices, to facilitate transfer of the heat away from the drivetrain 100. The heat exchanger 130 can be located on an upper portion (or lower portion, for example) of the drivetrain 100, above for instance the gearbox 110 (or motor 115 or inverter 105).

Some of the description herein emphasizes the structural independence of the aspects of the system components (e.g., front drive unit, and rear drive unit), and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "data processing system" "computing device" "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation.

Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. An electric drivetrain system, comprising:
an electric drivetrain of an electric vehicle, comprising an inverter component, a gearbox component and a motor component;
a first cooling system that uses ethylene glycol and water (EGW) based coolant, the first cooling system comprising:
an EGW coolant loop to distribute the EGW based coolant through at least one of the inverter component, a housing of the gearbox component, and a housing of the motor component to remove heat from the inverter component, the housing of the gearbox component, and the housing of the motor component;
a second cooling system that uses oil based coolant, the second cooling system comprising:
an oil coolant loop to distribute the oil based coolant through at least one of internal components of the gearbox component and internal components of the motor component to remove heat from at least the internal components of the gearbox component, and from at least the internal components of the motor component; and
an oil coolant pump to control a flow of the oil based coolant through the oil coolant loop; and a heat exchanger to transfer heat from the oil coolant loop to the EGW coolant loop, away from the electric drivetrain, to a vehicle cooling system having a radiator.

2. The electric drivetrain system of claim 1, comprising: the EGW coolant loop disposed in a path through a cold plate of the inverter component, the housing of the gearbox component, the heat exchanger, and the housing of the motor component.

3. The electric drivetrain system of claim 1, comprising: a reservoir of the oil based coolant located at least at a lower region of the gearbox component; and the oil coolant pump to deliver the oil based coolant from the reservoir into the oil coolant loop.

4. The electric drivetrain system of claim 1, wherein the second cooling system includes one or more nozzles supplied by the oil coolant loop to spray or splash a portion of the oil based coolant onto one or more gears of the gearbox component, the electric drivetrain system comprising a reservoir at least located at a lower region of the gearbox component to collect oil based coolant coming off the one or more gears of the gearbox component.

5. The electric drivetrain system of claim 1, comprising: the oil coolant loop disposed in a path through a coolant jacket for the housing of the motor component, and a path through a rotor component of the motor component.

6. The electric drivetrain system of claim 5, wherein the second cooling system includes one or more nozzles supplied by the oil coolant loop along the path through the rotor component, to spray or splash a portion of the oil based coolant onto at least one of a portion of the rotor component or a portion of a stator component of the motor component, the electric drivetrain system comprising a reservoir at least located at a lower region of the motor component to collect oil based coolant coming off the at least one of the portion of the rotor component or the portion of a stator component.

7. The electric drivetrain system of claim 1, wherein the oil coolant pump is operably coupled to a differential gear of the gearbox component to control the flow of the oil based coolant through the oil coolant loop, the flow of the oil based coolant to vary at least based on a rotational speed of the differential gear.

8. The electric drivetrain system of claim 1, wherein the first cooling system includes an EGW coolant pump to control a flow of the EGW based coolant through the EGW coolant loop, the EGW coolant pump having a pump controller in communication with the second cooling system, the pump controller to adjust the flow of the EGW based coolant through the EGW coolant loop when the second cooling system is operating at a coolant flow rate or a heat removal rate below a defined threshold.

9. The electric drivetrain system of claim 1, wherein the motor component and the inverter component reside
on a same side of the gearbox component, the inverter component mounted on a top or bottom side of the motor component, or
on different sides of the gearbox component, the inverter component mounted on a top or bottom side of the gearbox component.

10. A dual motor drivetrain system, comprising:
a first drive unit and a second drive unit of an electric vehicle, each of the first drive unit and the second drive unit comprising:
an electric drivetrain that includes an inverter component, a gearbox component, and a motor component;
a first cooling system that uses ethylene glycol and water (EGW) based coolant, the first cooling system comprising an EGW coolant loop to distribute the EGW based coolant through at least one of a housing of the inverter component, a housing of the gearbox component, and a housing of the motor component to remove heat from the housing of the inverter component, the housing of the gearbox component, and the housing of the motor component;
a second cooling system that uses oil based coolant, the second cooling system comprising an oil coolant loop to distribute the oil based coolant through at least one of internal components of the gearbox component and internal components of the motor component to remove heat from at least the internal components of the gearbox component, and to remove heat from at least internal components of the motor component; and
a heat exchanger to transfer heat from the oil coolant loop to the EGW coolant loop, away from the electric drivetrain, to a vehicle cooling system having a radiator; and
the EGW coolant loop of the first drive unit and the EGW coolant loop of the second drive unit connected within a coolant network to distribute the EGW based coolant.

11. The dual motor drivetrain system of claim 10, wherein the first drive unit comprises a front drive unit of the electric vehicle, and the second drive unit comprises a rear drive unit of the electric vehicle.

12. The dual motor drivetrain system of claim 10, wherein the first drive unit comprises a left drive unit of the electric vehicle, and the second drive unit comprises a right drive unit of the electric vehicle.

13. The dual motor drivetrain system of claim 10, comprising:
an EGW coolant pump to control a flow of the EGW based coolant through the EGW coolant loop of the first drive unit and the EGW coolant loop of the second drive unit.

14. The dual motor drivetrain system of claim 13, wherein the EGW coolant loop of the first drive unit and the EGW coolant loop of the second drive unit are connected in series or in parallel with respect to the EGW coolant pump.

15. The dual motor drivetrain system of claim 10, comprising:
an oil coolant pump to control a flow of the oil based coolant through the oil coolant loop of the first drive unit and the oil coolant loop of the second drive unit.

16. The dual motor drivetrain system of claim 10, wherein each of the first drive unit and the second drive unit includes an oil coolant pump to control a flow of the oil based coolant through the oil coolant loop of the respective first or second drive unit.

17. The dual motor drivetrain system of claim 10, comprising:
a heat exchanger to remove heat from the EGW coolant loop and the oil coolant loop of each of the first drive unit and the second drive unit of the electric vehicle.

18. The dual motor drivetrain system of claim 10, wherein each of the first drive unit and the second drive unit includes a heat exchanger to remove heat from the EGW coolant loop and the oil coolant loop of the respective first or second drive unit.

19. A method of liquid cooling an electric drivetrain system of an electric vehicle that includes an inverter component, a gearbox component and a motor component, comprising:

providing a first cooling system using ethylene glycol and water (EGW) based coolant, the first cooling system comprising an EGW coolant loop to distribute the EGW based coolant through at least one of a housing of the inverter component, a housing of the gearbox component, and a housing of the motor component to remove heat from the housing of the inverter component and the housing of the gearbox component, and the housing of the motor component;

providing a second cooling system using oil based coolant, the second cooling system comprising an oil coolant loop to distribute the oil based coolant through at least one of internal component of the gearbox component and internal components of the motor component to remove heat from at least the internal components of the gearbox component, and to remove heat from at least the internal components of the motor component, and an oil coolant pump to control a flow of the oil based coolant through the oil coolant loop; and providing a heat exchanger to transfer heat from the oil coolant loop to the EGW coolant loop, away from the electric drivetrain system; to a vehicle cooling system having a radiator.

20. The method of claim 19, comprising:

providing an EGW coolant pump to control a flow of the EGW based coolant through the EGW coolant loop, the EGW coolant pump having a pump controller in communication with the second cooling system, the pump controller to adjust the flow of the EGW based coolant through the EGW coolant loop when the second cooling system is operating at a coolant flow rate or a heat removal rate below a defined threshold.

* * * * *